United States Patent
Eguchi et al.

(10) Patent No.: US 8,458,421 B2
(45) Date of Patent: Jun. 4, 2013

(54) VOLUME MANAGEMENT APPARATUS AND STORAGE SYSTEM

(75) Inventors: Yoshiaki Eguchi, Yokohama (JP); Ai Satoyama, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 288 days.

(21) Appl. No.: 12/920,371

(22) PCT Filed: Mar. 9, 2010

(86) PCT No.: PCT/JP2010/001667
§ 371 (c)(1), (2), (4) Date: Aug. 31, 2010

(87) PCT Pub. No.: WO2011/111093
PCT Pub. Date: Sep. 15, 2011

(65) Prior Publication Data
US 2011/0225379 A1    Sep. 15, 2011

(51) Int. Cl.
G06F 12/00    (2006.01)

(52) U.S. Cl.
USPC .............................. 711/162; 711/161; 711/170

(58) Field of Classification Search
USPC ......................................... 711/162, 161, 170
See application file for complete search history.

(56) References Cited

U.S. PATENT DOCUMENTS

| | | |
|---|---|---|
| 2005/0055603 A1 | 3/2005 | Soran et al. |
| 2006/0277386 A1 | 12/2006 | Eguchi |
| 2007/0113034 A1* | 5/2007 | Maruyama et al. ........... 711/162 |
| 2008/0301763 A1* | 12/2008 | Sasaki et al. ...................... 726/1 |
| 2009/0043982 A1 | 2/2009 | Kano et al. |
| 2009/0055613 A1* | 2/2009 | Maki et al. .................... 711/165 |

FOREIGN PATENT DOCUMENTS

| | | |
|---|---|---|
| JP | 2003-15915 | 1/2003 |
| JP | 2006-338341 | 12/2006 |
| JP | 2008-134987 | 6/2008 |
| JP | 2009-251970 | 10/2009 |

* cited by examiner

*Primary Examiner* — Hashem Farrokh
(74) *Attorney, Agent, or Firm* — Brundidge & Stanger, P.C.

(57) ABSTRACT

The present invention allocates a suitable physical device to each volume page according to the state transition command relating to paired volumes. A plurality of logical devices forming a logical storage area of a plurality of physical devices of varying performance are tiered according to the performance of the physical devices to form a pool volume, and each of the areas of the primary logical volume, secondary logical volume and pool volume are managed by a controller, divided into a primary page, secondary page and pool page. Upon receiving a pair formation-related command from the host computer, the controller allocates pool pages belonging to the same tier to the primary page and secondary page, and upon subsequently receiving a pair-related state transition command, the controller allocates a pool page, in a different tier from the primary page, to the secondary page.

7 Claims, 38 Drawing Sheets

VDEV MANAGEMENT INFORMATION 3514

LDEV MANAGEMENT
INFORMATION 3512

POOL MANAGEMENT
INFORMATION 3521

TARGET DEVICE INFORMATION 3513

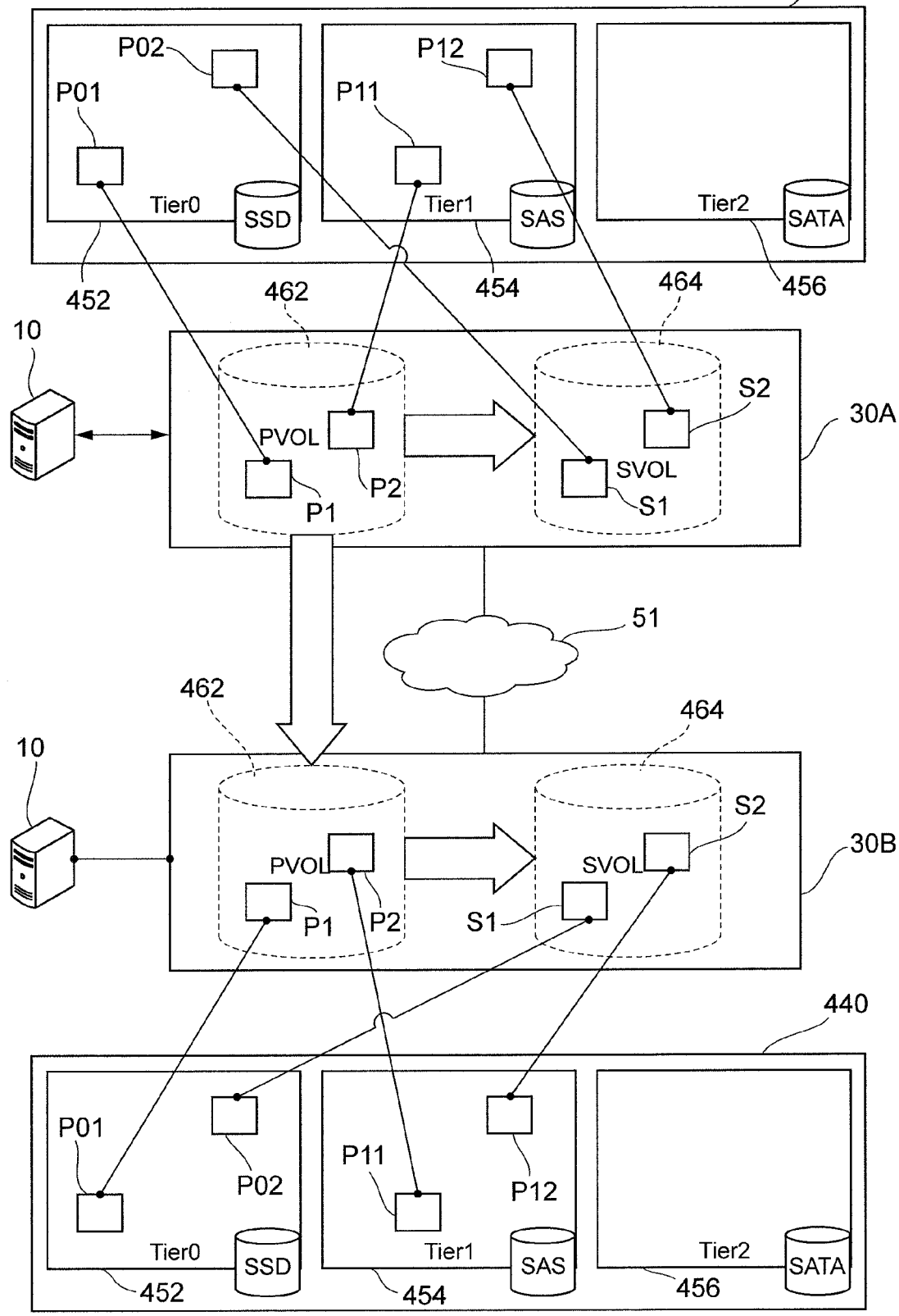

VOLUME MANAGEMENT APPARATUS AND STORAGE SYSTEM

TECHNICAL FIELD

The present invention relates to a volume management apparatus and a storage system for performing management to dynamically allocate pages to logical volumes which are access targets of a host computer.

BACKGROUND ART

Conventionally, there exist computer systems which provide a host computer with large-scale data storage services. Among such systems, a system is known which comprises a host computer, a storage server to which the host computer is connected, and a management apparatus for the storage server.

The storage server manages a plurality of hard disks using a RAID (Redundant Array of Independent/Inexpensive Disks) system. The storage server also virtualizes a physical storage area of a multiplicity of hard disks, and provides this physical storage area as logical volumes to the host computer. The host computer accesses the logical volumes and requests data reads and data writes.

One example of this type of virtualization technology is known as 'Thin Provisioning.' The storage server configures a virtual volume, which has no physical storage area, for the host computer. The storage server sequentially allocates storage area to the virtual volume in step with the host computer write-accessing the virtual volume.

Therefore this technology is effective in enabling storage resources to be effectively utilized in comparison with systems in which a large-capacity storage area is allocated to the logical volumes from the outset. This technology appears in Japanese Unexamined Patent Publication Nos. 2003-15915 and 2006-338341.

Means for providing storage area to the virtual volume comprises means obtained by placing a plurality of logical volumes each assigned real storage area into logical groups called 'pools.' The plurality of logical volumes are called 'pool volumes.' When the virtual volumes are write-accessed by the host computer, a corresponding storage area of the pool volume is assigned to the virtual volume access destination.

The storage server is capable of saving write data from the host computer by mapping an area of access by the host computer to the virtual volume to an area in which storage capacity has been allocated to the pool volume.

Meanwhile, in order to improve efficiency of investment in the storage server, a storage server is required in which used storage media (physical devices) of a plurality of types are prepared, and which is capable of defining data values and storing data by associating the values of the data with the storage media. Therefore, U.S. Patent Publication No. 2005/055603 discloses the dynamic re-allocation of suitable storage media to pages, which are the units in which capacity is allocated, in response to input/output access to the pages.

CITATION LIST

Patent Literature

[PTL1]
Japanese Unexamined Patent Publication No. 2003-15915
[PTL2]
Japanese Unexamined Patent Publication No. 2006-338341
[PTL3]
U.S. Patent Publication No. 2005/055603

SUMMARY OF INVENTION

Technical Problem

U.S. Patent Publication No. 2005/055603 discloses the automatic re-arrangement of suitable storage media onto pages, which are the units in which capacity is allocated, in response to input/output access to the pages. However, U.S. Patent Publication No. 2005/055603 does not disclose that suitable physical devices are allocated to the logical volumes which configuring paired volumes in response to a state transition command for changing the pair state between the paired logical volumes.

The present invention was conceived in view of the problems with the conventional technology and an object of the present invention is to provide a volume management apparatus and storage system with which suitable physical devices can be allocated to pages in each volume in response to a state transition command relating to paired volumes.

Solution to Problem

In order to achieve the foregoing object, the present invention is configured such that a plurality of logical devices forming a logical storage area of a plurality of physical devices of varying performance are tiered according to the performance of the physical devices and the tiered logical volumes are stored in a virtualization pool as pool volumes which correspond to each tier, a plurality of primary pages are allocated to a primary logical volume and a plurality of secondary pages are allocated to a secondary logical volume, the storage area of the pool volume in each tier belonging to the virtualization pool is divided into a plurality of pool pages and these pool pages are managed, and upon receiving a command relating to pair formation to pair the primary logical volume with the secondary logical volume, any of the pool pages is allocated to the primary page, and a pool page belonging to the same tier as the pool page allocated to the primary page is allocated to the secondary page, and upon receiving a state transition command relating to the pair from the device which issued the command, the tier of the pool page allocated to at least one of the primary page and secondary page is selected according to the state transition command.

Advantageous Effects of Invention

According to the present invention, suitable physical devices can be allocated to the pages of each of the volumes in response to a state transition command relating to paired volumes.

BRIEF DESCRIPTION OF DRAWINGS

FIG. 35 A block diagram to illustrate processing when terminating reverse processing after remote copy.

DESCRIPTION OF EMBODIMENTS

This embodiment is configured such that a plurality of logical devices forming a logical storage area of a plurality of physical devices of varying performance are tiered according to the performance of the physical devices and the tiered logical volumes are stored in a virtualization pool as pool volumes which correspond to each tier, a plurality of primary pages are allocated to a primary logical volume and a plurality of secondary pages are allocated to a secondary logical volume, the storage area of the pool volume in each tier belonging to the virtualization pool is divided into a plurality of pool pages and these pool pages are managed, and upon receiving a pair formation-related command, pool pages belonging to the same tier are allocated to the primary pages and secondary pages, and upon subsequently receiving a pair-related state transition command and when page migration is instructed by the state transition command, the pool page allocated to the secondary page is migrated to a pool page in a different tier from the pool page allocated to the primary page.

Figure 1:
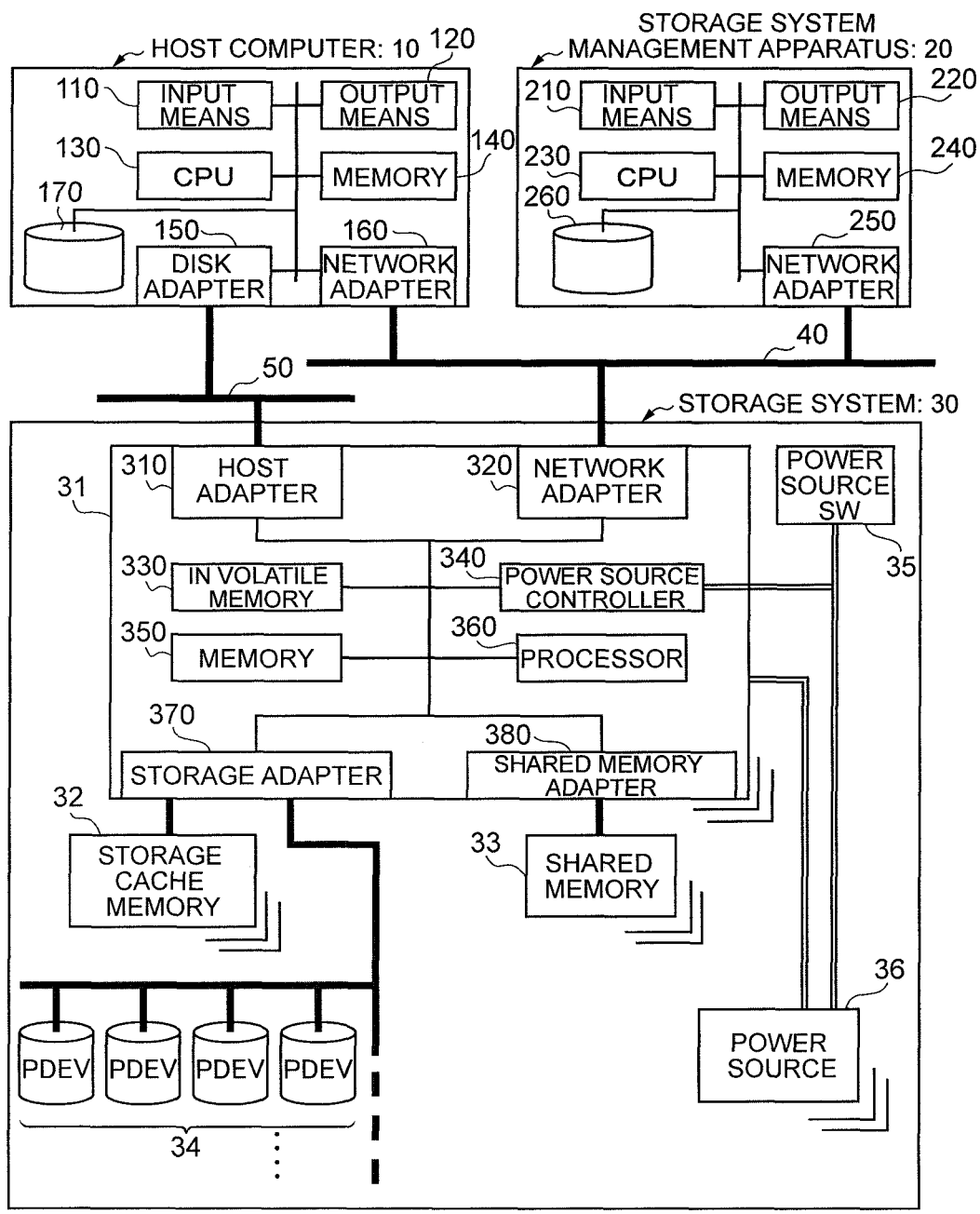
FIG. 1 A hardware block diagram of a computer system to which the present invention is applied.

An embodiment according to the present invention will be described hereinbelow with reference to the drawings. FIG. 1 is a hardware block diagram of a computer system to which the present invention is applied. The computer system comprises a host computer 10, a management apparatus 20, and a storage system 30 to which the host computer 10 and management apparatus 20 are connected. The storage system 30 is known as a storage server or a storage subsystem.

The host computer 10 accesses logical storage resources of the storage system 30. The management apparatus 20 manages the configuration of the storage area of the storage system 30. The storage system 30 stores data in the storage area configured in the physical device 34.

The host computer 10 comprises input means 110, output means 120, a CPU (Central Processing Unit) 130, a memory 140, a disk adapter 150, a network adapter 160, and a disk drive 170. The input means 110 is means for receiving inputs from the system administrator or the like operating the host computer 10. The input means 110 comprises a keyboard, for example. The output means 120 is means for displaying the state and configuration items of the host computer 10. The output means 120 comprises a display device, for example. Note that the configuration includes one or two of the host computer 10.

The CPU 130 reads programs stored in the disk drive 170 to the memory 140 and executes the processing that is prescribed by the program. The memory 140 comprises a RAM or the like, for example, and stores programs and data and so forth.

The disk adapter 150 is connected to the storage system 30 via a storage network 50, and sends and receives data to and from the storage system 30. The storage network 50 comprises a protocol (Fibre Channel, for example) which is suited to data transfers.

The network adapter 160 sends and receives data to and from the storage system management apparatus 20 or the storage system 30 via the management network 40. The management network 40 comprises an Ethernet (registered trademark), for example.

The disk drive 170 comprises a hard disk device, for example, and stores data and programs and so forth.

The management apparatus 20 comprises input means 210, output means 220, a CPU 230, a memory 240, a network adapter 250, and a disk drive 260.

The input means 210 is means for receiving inputs from the system administrator or the like operating the management apparatus 20. The input means 210 comprises a keyboard, for example. The output means 220 is means for displaying the state and configuration items of the management apparatus 20. The output means 220 comprises a display device, for example.

The CPU 230 reads a management program (management software) which is stored on the disk drive 260 to the memory 240, and executes management processing with respect to the storage system 30 based on this program. The memory 240 comprises a RAM or the like, for example, and stores programs and data and so forth.

The network adapter 250 sends and receives data to and from the host computer 10 or the storage system 30 via the management network 40.

The disk drive 260 comprises a hard disk device, for example, and stores data and programs and so forth.

The storage system 30 comprises a controller 31, a storage cache memory 32, a shared memory 33, a physical device (PDEV) 34, a power source switch 35, and a power source 36.

The controller 31 controls storage of data to a storage area which the physical device (PDEV) 34 comprises.

The storage cache memory 32 temporarily stores data which is read/written from/to the physical device (PDEV) 34. The shared memory 33 stores configuration information of the controller 31 and the PDEV 34 and so on. The physical device (PDEV) 34 comprises a plurality of disk devices. The power source 36 supplies electrical power to each of the parts of the storage system 30. The power source switch 35 is a switch which turns ON/OFF the power supply from the power source 36. The disk drive (storage device) comprises a hard disk drive, for example, and mainly stores user data. The storage device may be a drive comprising a semiconductor memory such as a flash memory.

The controller 31 comprises a host adapter 310, a network adapter 320, an involatile memory 330, a power controller 340, a memory 350, a processor 360, a storage adapter 370, and a shared memory adapter 380.

The host adapter 310 sends and receives data to and from the host computer 10 via the storage network 50. The network adapter 320 sends and receives data to and from the host computer 10 or the storage system management apparatus 20 via the management network 40.

The involatile memory 330 comprises a hard disk or flash memory, and stores programs and configuration information and so forth operated by the controller 31. The power source controller 340 controls the electrical power supplied from the power source 36.

The memory 350 comprises a RAM (Random Access Memory) or the like, for example, and stores programs and data and so forth. The processor 360 reads programs stored in the involatile memory 330 to the memory 350 and executes the processing that is prescribed by the programs.

The storage adapter 370 sends and receives data between the physical device (PDEV) 34 and the storage cache memory 32. The shared memory adapter 380 sends and receives data to and from the shared memory 33.

Figure 2:
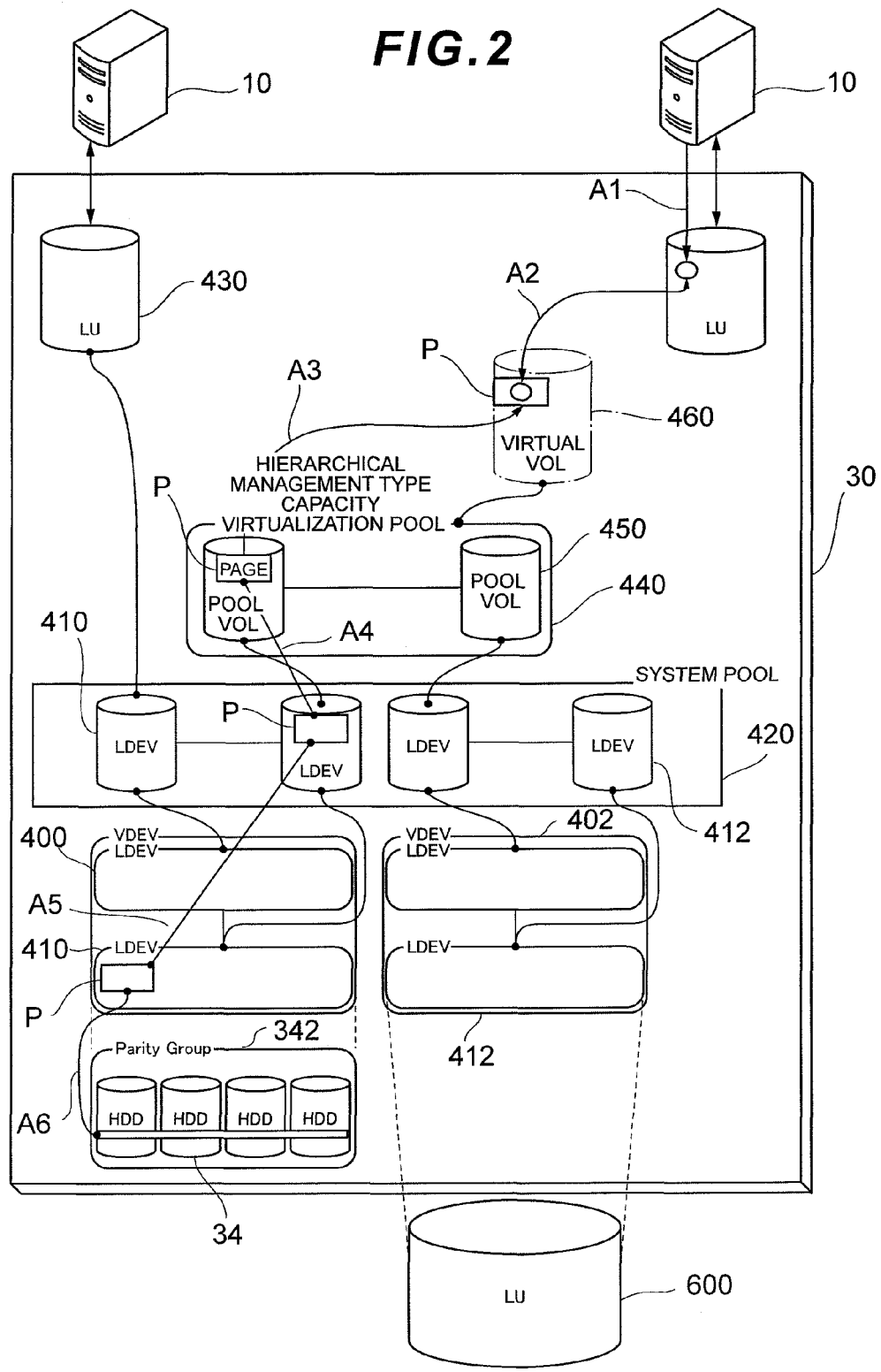
FIG. 2 A function block diagram showing an operation for dynamically allocating storage area which is performed by the storage system, in the computer system shown in FIG. 1.

FIG. 2 is a function block diagram illustrating an operation for dynamically allocating storage area which is performed by the storage system 30 in the computer system shown in FIG. 1.

In FIG. 2, a plurality of physical devices (PDEV) 34 comprise a parity group 342, for example, and a virtual device (LDEV) 400 is formed by the physical devices (PDEV) 34 which belong to the parity group 342. The virtual device 400 comprises a first-type VDEV, and is divided by a plurality of logic devices (LDEV) 410 which form a logical storage area of the physical devices 34 belonging to the parity group 342.

The logic devices (LDEV) 410 are each stored in the system pool 420 as first-type LDEV and managed in association with logical volumes or logical units (LU) 430 which are the access targets of the host computer 10. In other words, the host computer 10 is able to access the logical units 430 as target devices and the logical units 430 are configured by defining a path to the logic devices 410 for the host computer 10.

In addition, if an external physical device 600 is connected to the outside of the storage system 30, a virtual device (LDEV) 402 is created from the external physical device 600. The virtual device (VDEV) 402 is divided by a plurality of logic devices (LDEV) 412 which form the logical storage area of the external physical device 600. The logic devices (LDEV) 412 are each stored in the system pool 420 and associated with logical volumes or logical units (LU) 430 in the same way as the logic devices 410.

Furthermore, the logic devices (LDEV) 410, 412 are each associated with pool volumes 450 which are stored in the hierarchical management-type capacity virtualization pool 440. A virtual volume 460 forms a target device which is an access target of the host computer 10, and comprises a virtual device (VDEV). The virtual device (VDEV) is, as a second-type VDEV, divided into a plurality of logic devices (LDEV), and the logic devices (LDEV) are, as second-type LDEV, each associated with the pool volumes 450.

Here, the virtual storage area of the virtual volume 460, the storage area of the pool volumes 450, and the storage area of each of the logic devices 410 and 412 are each divided into a plurality of areas, and pages, which are the units in which capacity is allocated, are allocated to each of the areas.

Furthermore, when access relating to new writing to an unallocated area is made to the virtual volume 460 which includes a plurality of logic devices (LDEV) (A1), pages P of the virtual volume 460 are allocated to the new write access (A2), pages P of the pool volumes 450 are allocated to the pages P of the virtual volume 460 (A3), and pages P of the logic volumes 410 are allocated to the pages P of the pool volume 450 (A4, A5). The physical devices (PDEV) 34 which belong to the parity group 342 are allocated to the pages P of the logic devices 410 (A6). As a result, write data comes to be written to the physical devices (PDEV) 34 which correspond to the pages P of the logic devices 410.

Here, the physical devices (PDEV) 34 are storage devices of varying performance or costs which comprise, for example, SSD (Solid State Drives), SAS (Serial Attached SCSI) Disks (also referred to hereinafter as 'SAS'), SATA (Serial ATA) Disks (also referred to hereinbelow as 'SATA'), and FC (Fibre Channel) Disks (also called 'FC' hereinbelow) and, if these storage devices are divided into a plurality of groups according to their performance such as, for example, their response time to read access or write access, the logic devices 410 and 412 are constructed in tiers in correspondence with the performance of each of the physical devices (PDEV) 34, and the pool volumes 450 are also constructed in tiers in correspondence with the performance of each of the physical devices (PDEV) 34.

For example, if the physical devices (PDEV) 34 comprise physical devices of three different types of varying performance, namely, SSD, SAS, and SATA, these physical devices (PDEV) 34 are tiered divided into three groups, where SSD is Tier0, SAS is Tier1, and SATA is Tier2. In this case, the logical volumes 410, 412 are tiered divided into three tiers, namely an SSD-comprising logical volume which belongs to Tier0, an SAS-comprising logical volume which belongs to Tier1, and a SATA-comprising logical volume which belongs to Tier2, and the pool volumes 450 are tiered in correspondence with the logical volumes tiered divided into three tiers, and stored in the hierarchical management-type capacity virtualization pool 440.

Figure 3:
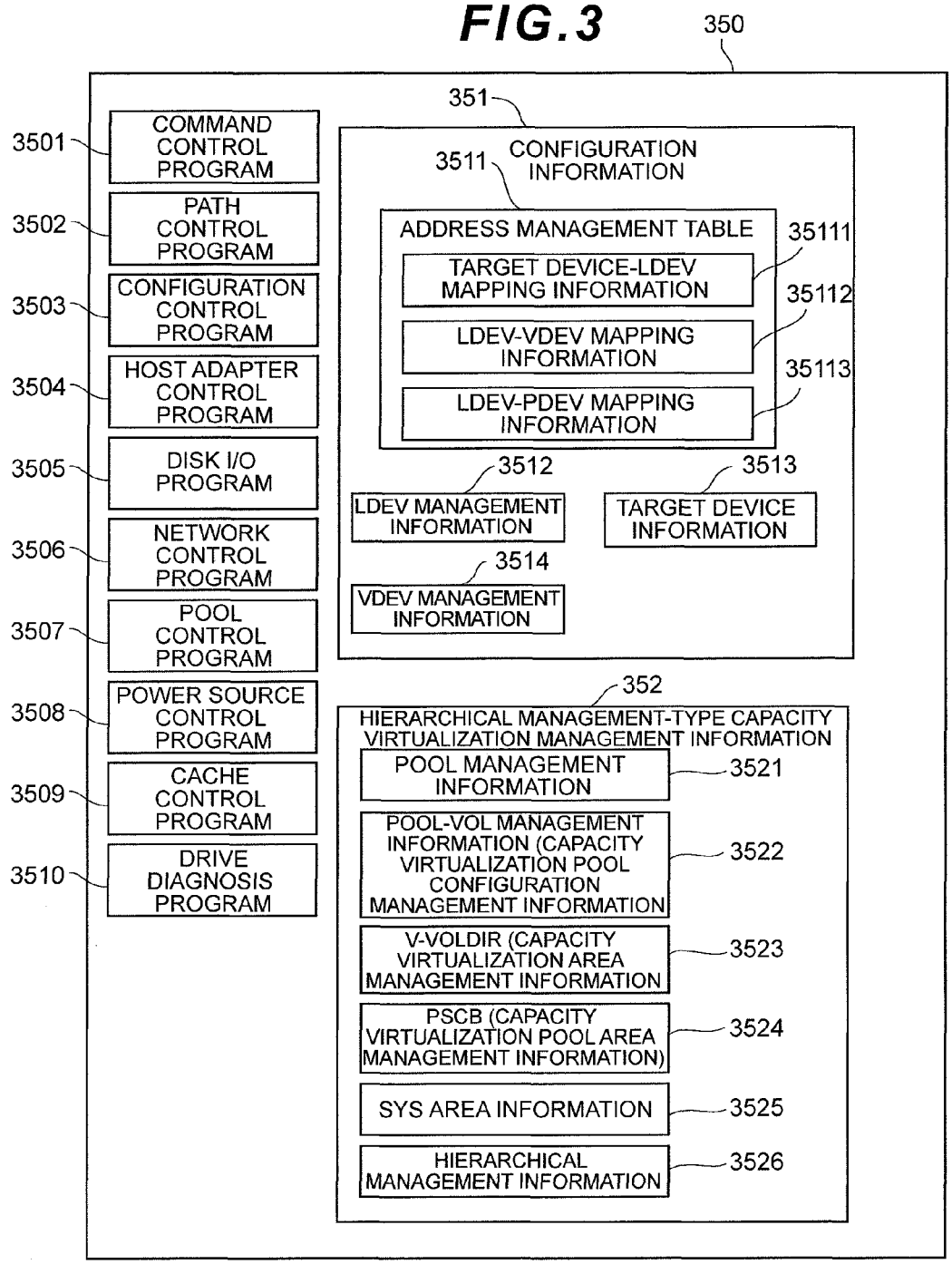
FIG. 3 A block diagram of memory of the storage system.

FIG. 3 is a block diagram of the memory 350 of the storage system 30. The memory 350 stores various programs which are read and executed by the processor 360, configuration information 351 relating to LDEV configuration, and pool information 352 relating to configuration of the capacity virtualization pool 440 and the system pool 420.

The command control program 3501 parses commands from the host computer 10 or the storage system management apparatus 20 and executes processing that is prescribed by these commands. The path control program 3502 configures a path to the host computer 10. The host adapter control program 3504 controls input/output data of the host adapter 310. The configuration control program 3503 controls the configuration of the storage system 30. The disk I/O program 3505 controls access to the physical devices (PDEV) 34.

The network control program 3506 controls data which is sent and received via the storage network 50 or management network 40. The pool control program 3507 configures the capacity virtualization pool 440 and the system pool 420. The power source control program 3508 controls the ON/OFF of the electrical power supplied by the power source 36. The cache control program 3509 controls the area and data of the storage cache memory 32. The drive diagnosis program 3510 diagnoses the state of each disk device of the PDEV (physical devices 34).

The configuration information 351 stores configurations relating to the virtual devices (VDEV) 400, and logic devices (LDEV) 410, 412 of the storage system 30. The pool information 352 stores configurations relating to the capacity virtualization pool 440 and the system pool 420, and so on. The configuration information 351 includes an address management table 3511, LDEV management information 3512, target device information 3513, and VDEV management information 3514.

The address management table 3511 stores address mapping information for the target devices, LDEV and VDEV, and the physical devices. The address management table 3511 includes target device-LDEV mapping information 35111, LDEV-VDEV mapping information 35112, and VDEV-PDEV mapping information 35113. The LDEV management information 3512 stores information relating to LDEV (logic devices 410, 412). The target device information 3513 stores target device-related information. The VDEV management information 3514 stores information relating to VDEV (virtual devices 400, 402).

The hierarchical management-type capacity virtualization management information 352 includes POOL management information 3521, POOL-VOL management information (capacity virtualization pool configuration management information) 3522, V-VOLDIR (capacity virtualization area management information) 3523, PSCB (capacity virtualization pool area management information) 3524, SYS area information 3525, and hierarchical management information 3526.

The pool management information 3521 stores configurations of the capacity virtualization pool 440. The POOL-VOL management information 3522 stores information on the pool volumes 450 of the capacity virtualization pool 440. The V-VOLDIR 3523 stores address allocation of the pool volumes 450 of the capacity virtualization pool 440. The PSCB information (capacity virtualization pool area management information) 3524 stores address information of the pool volumes 450 in the capacity virtualization pool 440. The SYS area information 3525 stores information of the LDEV storing the configuration information of the storage system 30. The hierarchical management information 3526 stores information relating to the tiers of the pool volumes 450 in the capacity virtualization pool 440.

Figure 4:
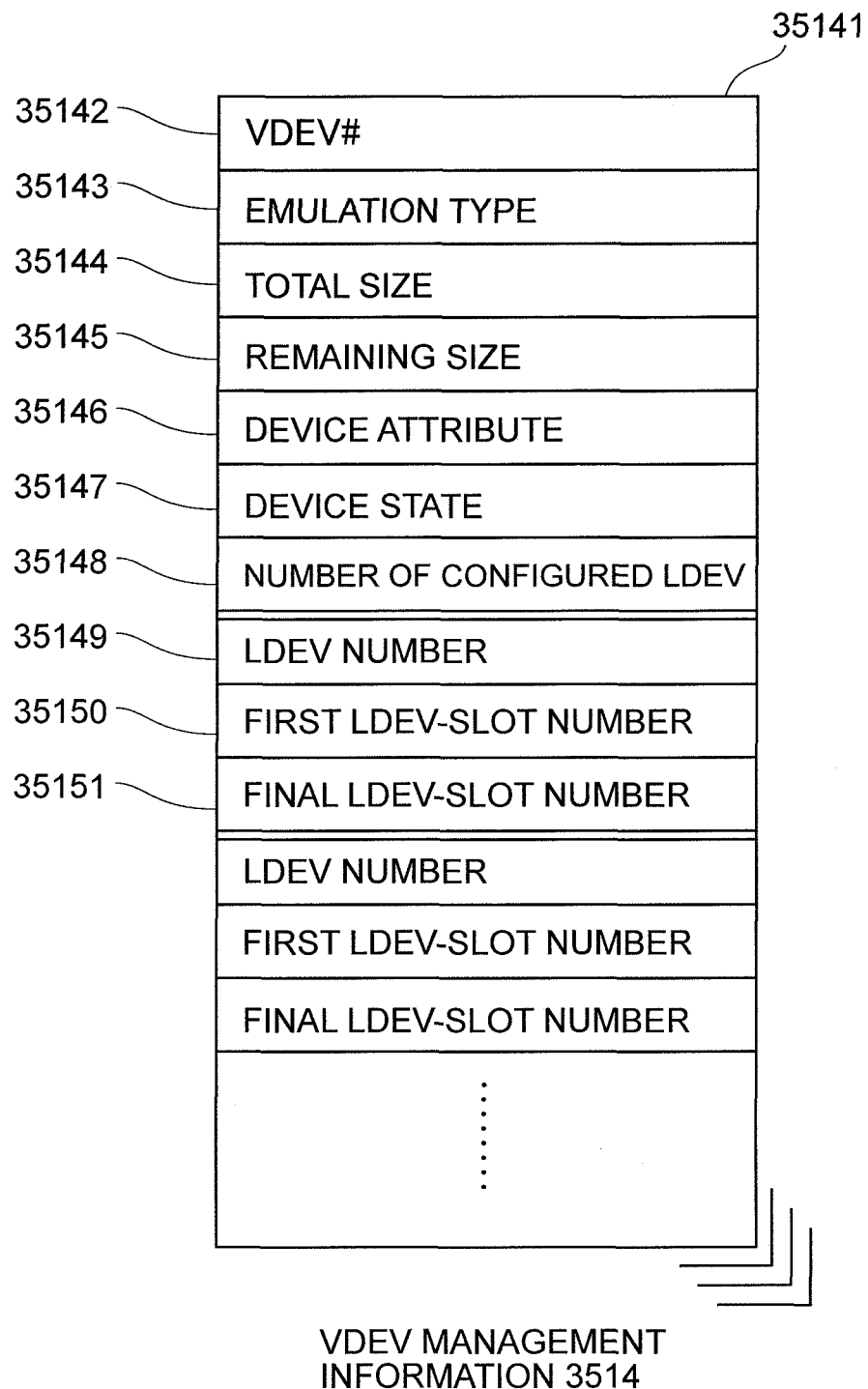
FIG. 4 A configuration diagram to illustrate VDEV management information.

FIG. 4 is a diagram illustrating the VDEV management information. The VDEV management information 3514 comprises VDEV-specific information 35141. The VDEV-specific information 35141 comprises a VDEV number (VDEV#) 35142, an emulation type 35143, a total size 35144, a remaining size 35145, a device attribute 35146, a device state 35147, a number of configured LDEV 35148, an LDEV number 35149, a first VDEV-SLOT#35150, and a final VDEV-SLOT#35151.

The VDEV#35142 is an identifier of the VDEV (virtual device 400, 402). The emulation type 35143 is a VDEV emulation type identifier. The total size 35144 is the total size configured for the VDEV. The remaining size 35145 is the size of the unused area of the VDEV.

The device attribute 35146 is an identifier for the attribute that is defined for the VDEV. If the VDEV is a first-type VDEV (a VDEV allocated to the logical unit 430), an identifier indicating the first-type VDEV is stored, and if the VDEV is a second-type VDEV and configured in the virtual volume 460, an identifier indicating the second-type VDEV is stored.

The device state 35147 is an identifier that indicates the VDEV state. The VDEV states are normal, closed, and closed due to a fault, or the like. Closure indicates closure for reasons other than fault generation, such as closure caused by a puncture. Closure due to a fault indicates closure due to the generation of some kind of fault with the device.

The number of configured LDEV 35148 is the total number of LDEV configured for the VDEV. For the LDEV number 35149, the number of the LDEV configured for the VDEV is stored. The first VDEV-SLOT#35150 is an identifier of the first physical slot number of the configured LDEV.

The final VDEV-SLOT#35151 is the final physical slot number of the configured LDEV. The LDEV number 35149, the first VDEV-SLOT#35150, and the final VDEV-SLOT#35151 are configured for each of the LDEV numbers in the same quantity as the number of LDEV.

Figure 5:
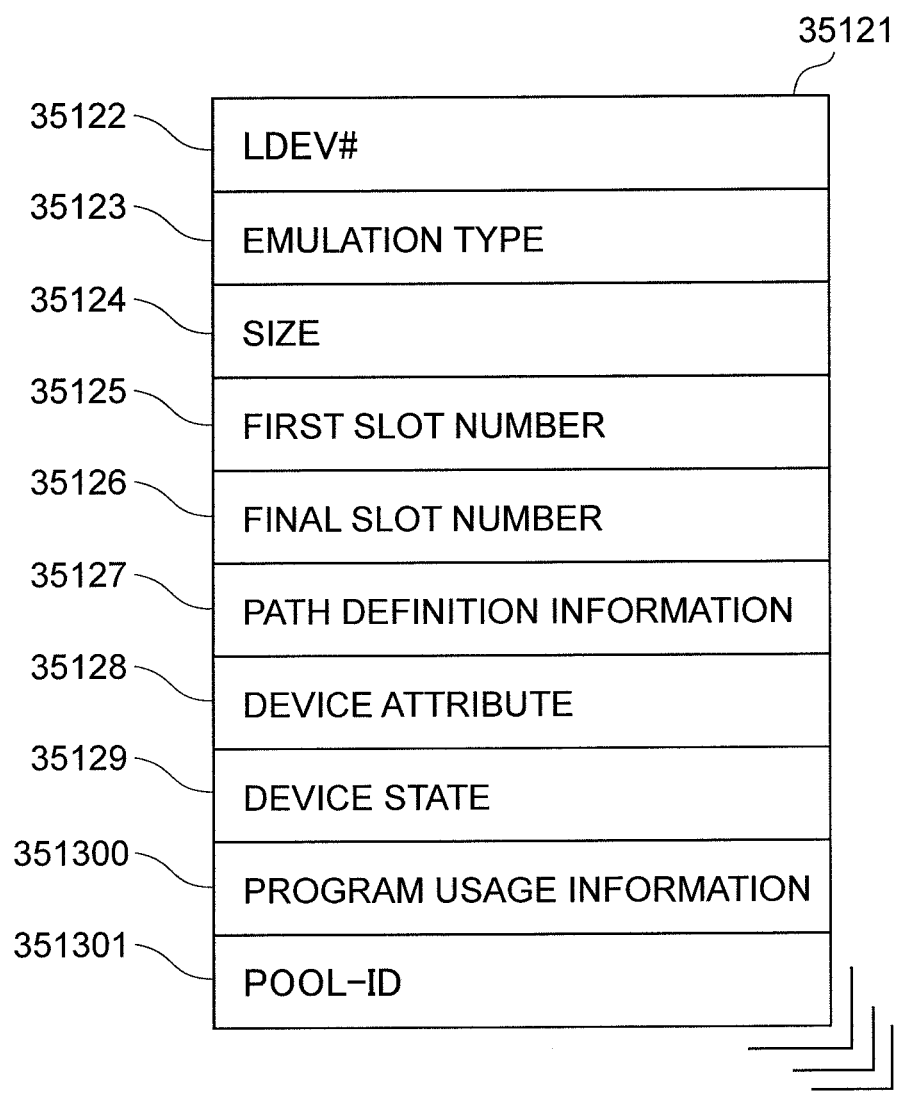
FIG. 5 A block diagram to illustrate LDEV management information.

FIG. 5 is a diagram illustrating the LDEV management information. The LDEV management information 3512 comprises VDEV-specific information 35121. The LDEV-specific information 35121 comprises an LDEV number (LDEV#) 35122, an emulation type 35123, a size 35124, a first slot number 35125, a final slot number 35126, path definition information 35127, a device attribute 35128, a device state 35129, a program usage state 35130, and a POOL-ID 351301.

The LDEV#35122 is an identifier of the LDEV (logic device 410, 412). The emulation type 35123 is an LDEV emulation type identifier. The size 35124 is the total size configured for the LDEV.

The first slot number 35125 is an identifier of the first slot number of the configured LDEV. The final slot number 35126 is the final slot number of the configured LDEV. The path definition information 35127 is an identifier of the path defined in the host computer 10.

The device attribute 35128 is an identifier of the LDEV attribute. If the LDEV is a first-type LDEV, an identifier indicating the first-type LDEV is stored, and if the LDEV is a second-type LDEV, an identifier indicating the second-type LDEV is stored. Furthermore, if the LDEV is configured in the capacity virtualization pool 440, an identifier indicating the pool attribute is stored.

The device state 35129 is an identifier that indicates the state of the VDEV to which the LDEV belongs. The VDEV states are normal, closed, and closed due to a fault, or the like. Closure indicates closure for reasons other than fault generation, such as closure caused by a puncture. Closure due to a fault indicates closure due to the generation of some kind of fault with the device.

If the LDEV is being processed by some kind of program, the program usage state 351300 stores the identifier of the program. If the LDEV is configured in the capacity virtualization pool 440, the POOL-ID 351301 stores an identifier for the LDEV.

Figure 6:
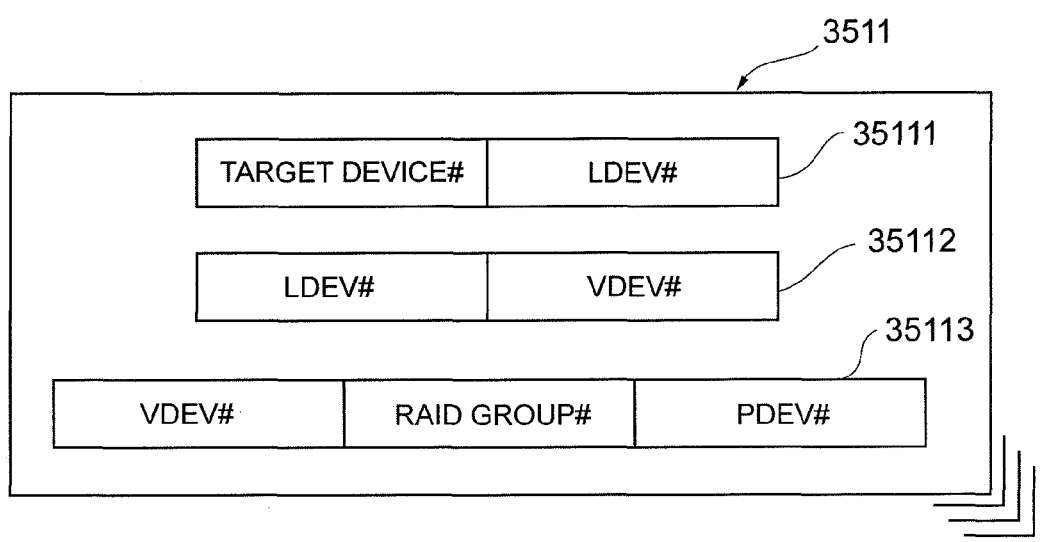
FIG. 6 A block diagram to illustrate an address management table.

FIG. 6 is a diagram illustrating the address management table. The address management table 3511 stores address mapping information for the target devices, LDEV and VDEV, and the physical devices 34. The address management table 3511 includes target device-LDEV mapping information 35111, LDEV-VDEV mapping information 35112, and VDEV-PDEV mapping information 35113.

The target device-LDEV mapping information 35111 stores correspondence between the target device address and LDEV address. The LDEV-VDEV mapping information 35112 stores LDEV (first-type LDEV, second-type LDEV) addresses and VDEV (first-type VDEV, second-type VDEV) addresses.

The VDEV-PDEV mapping information 35113 stores VDEV addresses, RAID group numbers (or parity group) and PDEV (physical device 34) addresses.

The storage system 30 is able to recognize that a target device address corresponds to an address of any given LDEV by referring to the address management table 3511. The storage system 30 is also able to recognize that an LDEV address corresponds to an address of any given VDEV. The storage system 30 is also able to recognize that a VDEV address belongs to any given RAID group and corresponds to an address of any given PDEV.

Figure 7:
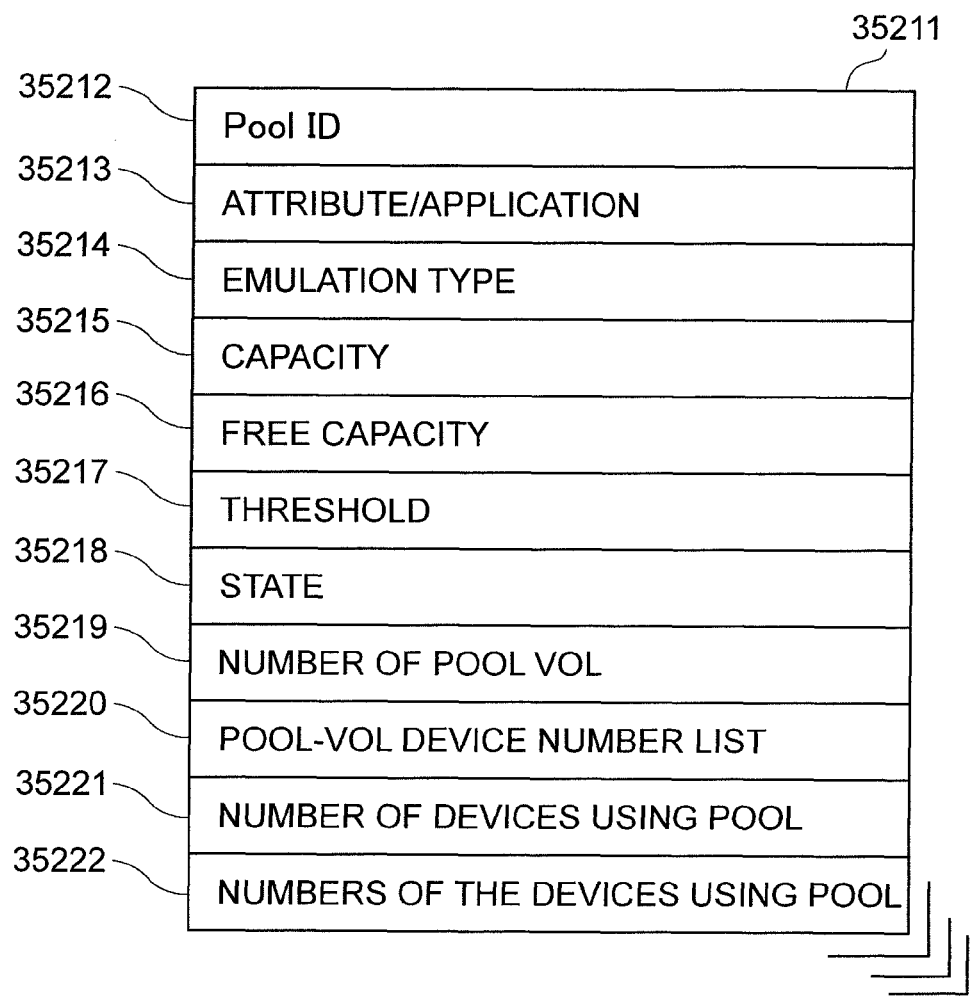
FIG. 7 A block diagram to illustrate POOL management information.

FIG. 7 is a diagram illustrating the POOL management information. The POOL management information 3521 comprises POOL-specific information 35211. The POOL-specific information 35211 comprises a POOL-ID 35212, an attribute/application 35213, an emulation type 35214, a capacity 35215, free capacity 35216, a threshold 35217, a state 35218, a number of POOL-VOL 35219, a POOL-VOL device number list 35220, a number of devices using the POOL 35221, and the number of the device using the POOL 35222.

The POOL-ID 35212 is an identifier of the POOL (capacity virtualization pool 440). The attribute/application 35213 is an identifier indicating the attribute and application of the capacity virtualization pool 440. The application can be an operating form application such as a snapshot or SYS area or the like, for example.

The emulation type 35214 is an identifier for the emulation type of the capacity virtualization pool 440. The capacity 35215 is the total capacity of the capacity virtualization pool 440, and the unused capacity 35216 is the size of the unused area of the capacity virtualization pool 440.

The threshold 35217 is the maximum data storage capacity allowed by the capacity virtualization pool 440. The state 35218 is the current state of the capacity virtualization pool 440. The state is 'being defined', 'undergoing expansion,' 'valid,' and so on, for example. The number of POOL-VOL 35219 is the total number of LDEV configured as the capacity virtualization pool 440.

The POOL-VOL device number list 35220 is a list of LDEV numbers configured as the capacity virtualization pool 440. The number of devices using the POOL 35221 is the number of second-type LDEV with which the LDEV of the capacity virtualization pool 440 are associated. The number of the devices using the POOL 35222 is a list of the numbers of the second-type LDEV with which the LDEV of the capacity virtualization pool 440 are associated.

Figure 8:
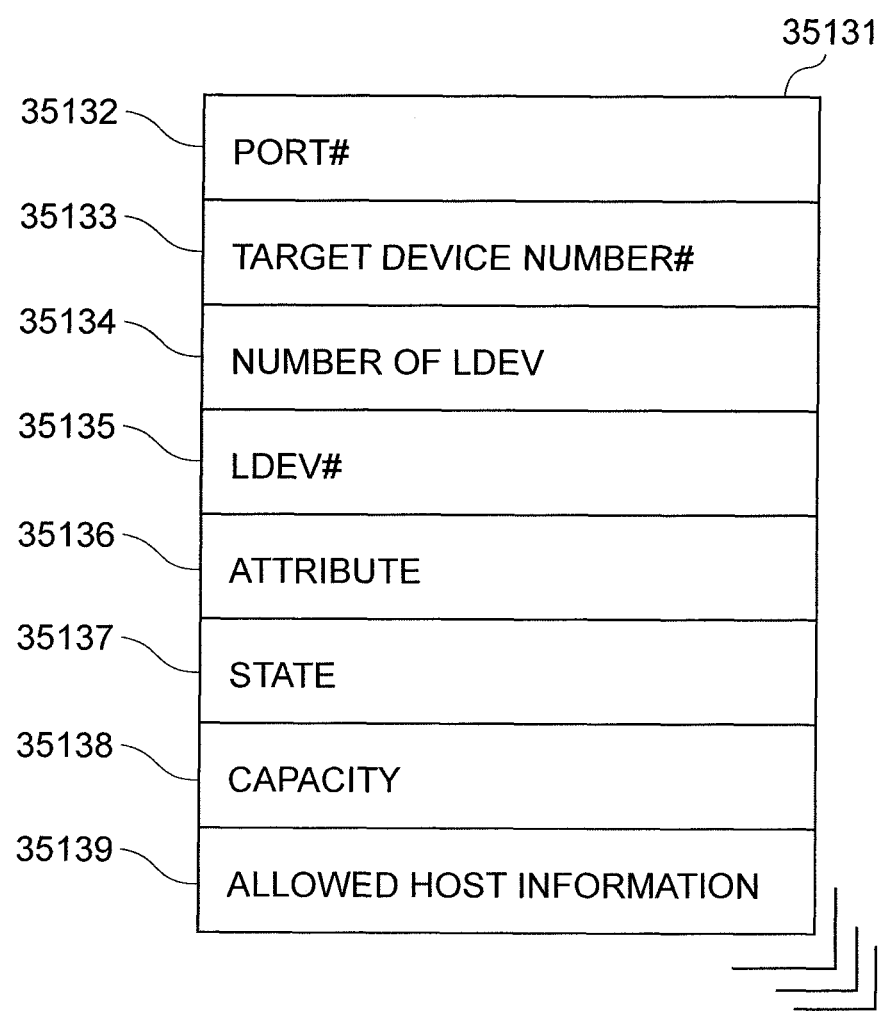
FIG. 8 A block diagram to illustrate target device information.

FIG. 8 is a diagram illustrating target device information. The target device information 3513 comprises target device-specific information 35131. The target device-specific information 35131 comprises a port#35132, a target device number#35133, a number of LDEV 35134, an LDEV#35135, an attribute 35136, a state 35137, a capacity 35138, and allowed host information 35139.

The port#35132 is the port number of the host adapter 310. The target device number#35133 indicates the number of the target device, and when the virtual volume 460 is the target device, for example, indicates the number of the virtual volume 460. The number of LDEV 35134 indicates, when the virtual volume 460 is the target device, the number of LDEV (second-type LDEV) which the virtual volume 460 comprises. The LDEV #35135 indicates, when the virtual volume 460 is the target device, for example, the numbers of the LDEV (second-type LDEV) which the virtual volume 460 comprises.

The attribute 35136 indicates, when the virtual volume 460 is the target device, for example, the attribute of the virtual volume 460. The state 35137 indicates, when the virtual volume 460 is the target device, the state of the virtual volume 460 such as a state where the virtual volume 460 is an access target, for example. The capacity 35138 indicates, when the virtual volume 460 is the target device, the capacity of the LDEV (second-type LDEV) which the virtual volume 460 comprises. The allowed host information 35139 is information which indicates, when the virtual volume 460 is the target device, whether or not access to the virtual volume 460 is allowed.

Figure 9:
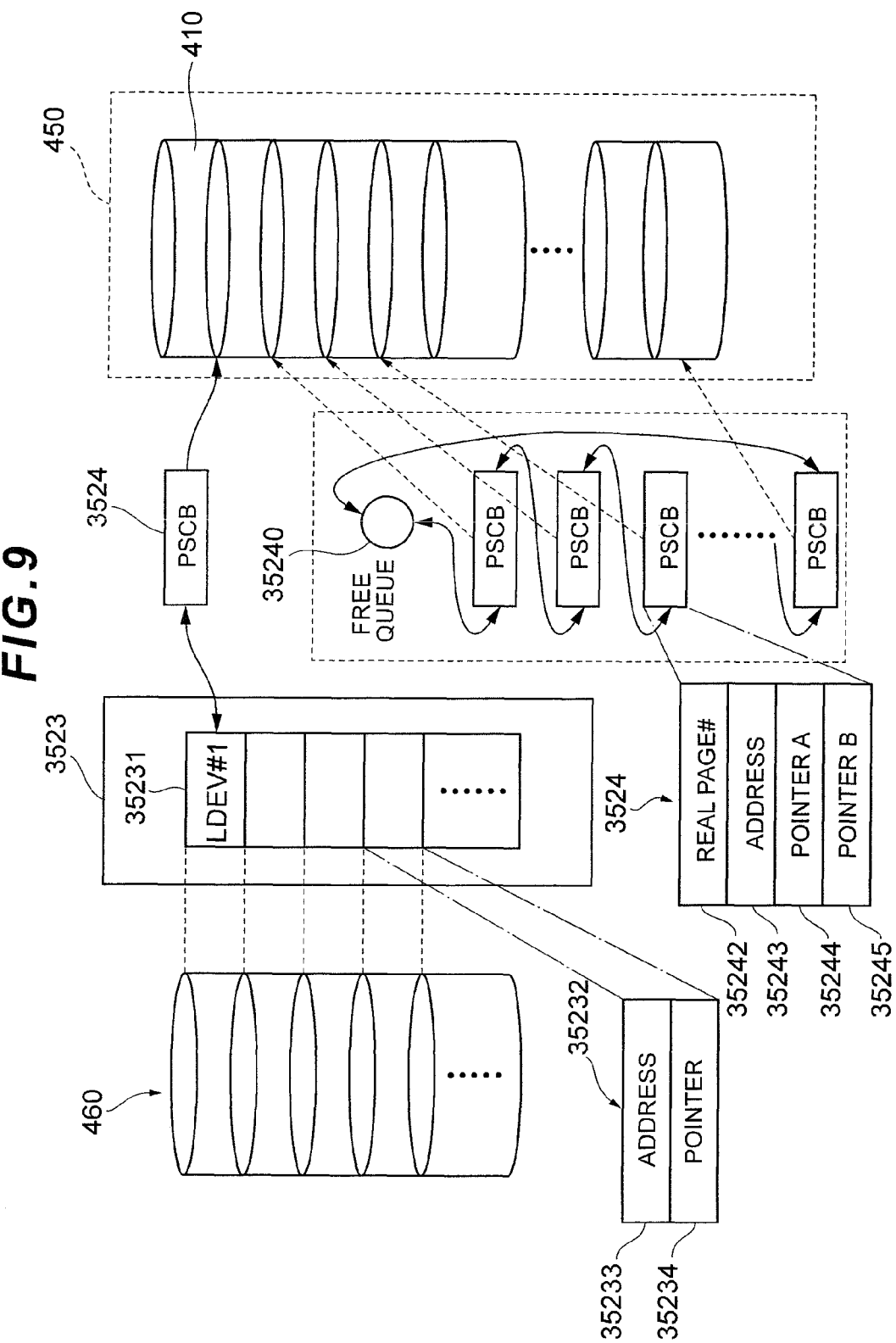
FIG. 9 A block diagram to illustrate the relationships between the PSCB and pool volumes, and virtual volumes.

FIG. 9 is a block diagram to illustrate the relationships between the virtual volumes, and the PSCB and pool volumes. The VVOL-DIR 3523 is configuration information of the second-type LDEV which is the storage area of the virtual volume 460. The PSCB (POOL-SLOT Control Block) 3524 is configuration information of the first-type LDEV configured in the pool volumes 450.

The storage system 30 forms a first-type VDEV (virtual device 400) from the physical devices (PDEV) 34 by means of a RAID configuration. The first-type VDEV is divided into a first-type LDEV (logic device 410) which is a storage area. The first-type LDEV is configured in the system pool 420. A volume which comprises the first-type LDEV configured in the system pool 420 is taken as the pool volume (POOL-VOL) 450.

Furthermore, the storage system 30 configures the virtual volume (VVOL) 460 and comprises the second-type VDEV (virtual device). The second-type VDEV is divided into second-type LDEV (logic devices) which are storage areas.

The storage system 30 allocates the second-type LDEV of the virtual volume 460 to the first-type LDEV (logic device 410) of the pool volume 450. As a result, a storage area of the virtual volume 460 accessed by the host computer 10 is configured in the first-type LDEV (logic device 410) comprising the physical devices (PDEV) 34. The configuration of the virtual volume 460 is stored in the VVOL-DIR 3523. The VVOL-DIR 3523 comprises an LDEV number (LDEV#) 35231 and an entry 35232.

The LDEV number (LDEV#) 35231 is an identifier of the second-type LDEV (logic device). The entry 35232 is configuration information of the second-type LDEV. The entry 35232 comprises a second-type LDEV address 35233 and a PSCB pointer 35234.

The second-type LDEV address 35233 stores the address of the second-type LDEV (logic device) of the virtual volume 460.

The PSCB pointer 35234 stores, if the second-type LDEV (logic device) is allocated to the first-type LDEV (logic device 410) of the pool volume 450, the PSCB pointer 35234 stores the pointer of the area of the first-type LDEV (logic device 410). Note that, in an initial state, the second-type LDEV is not allocated to the first-type LDEV and hence the PSCB pointer 35234 stores 'NULL.'

The PSCB (POOL-SLOT Control Block) 3524 is information of the first-type LDEV (logic device 410) configured in the pool volume 450. PSCB 3524 are configured for each slot of the first-type LDEV (logic device 410) configured in the pool volume 450.

The PSCB 3524 comprises a real page number (real page#) 35242, an address 35243 of the pool volume 450, a pointer A35244, and a pointer B35245.

The real page number (real page#) 35242 is the real page number of the first-type LDEV (logic device 410) in the pool volume 450. The address 35243 of the pool volume 450 is the address of the first-type LDEV (logic device 410) in the pool volume 450.

The pointer A35244 and the pointer B35245 are identifiers of the slots before and after the first-type LDEV (logic device 410) in the pool volume 450.

Moreover, the header, of an unused area within the pool volume 450 area, is indicated by the free PSCB queue 35240. The free PSCB queue 35240 includes the pointer to the PSCB 3524 indicating the next slot.

The storage system 30 refers to the pointer indicated by the free PSCB queue 35240 to obtain the next PSCB 3524. The storage system 30 also refers to the pointer B35245 of the next PSCB 3524 in order to follow the PSCB 3524 stepwise. The storage system 30 then obtains the PSCB 3524 which corresponds to the final slot of the unused area.

The pointer B35245 of the final PSCB 3524 is a free PSCB queue 35240. The storage system 30 follows the free PSCB queue 35240 and is able to determine the unused area of the pool volumes 450 of the capacity virtualization pool 440 from the aggregate group which is linked by pointers of the PSCB 3524.

The storage system 30 configures the PSCB 3524 which correspond to the first-type LDEV (logic devices 410) configured in the pool volume 450. More specifically, the storage system 30 configures the PSCB 3524 which correspond to each slot of the first-type LDEV (logic devices 410) configured in the pool volumes 450, and configures the free PSCB queue 35240. In an initial state, the pool volumes 450 are completely unused and therefore the aggregate group linked by the free PSCB queue 35240 corresponds to all the areas of the first-type LDEV (logic devices 410) configured in the pool volumes 450.

Furthermore, if the area of a pool volume 450 is used, this area is made usable as a result of the storage system 30 allocating a quantity of the PSCB 3524 which corresponds to the required slots to the VVOL-DIR 3523 which is a second-type LDEV. The aggregate of the plurality of slots is equivalent to a page. A page is specified from a plurality of PSCB. Access to the virtual volume 460 from the host computer 10, and allocation of storage area from the pool volume 450 to the access area of the virtual volume 460 are executed in page units.

More specifically, the storage system 30 refers to the free PSCB queue 35240. The storage system 30 then acquires a quantity of PSCB 3524 which corresponds to the required area (pages) allocated to the second-type LDEV. The storage system 30 then allocates the acquired PSCB 3524 to each of the entries of the VVOL-DIR 3523. In other words, the PSCB pointer 35234 of each of the entries in the VVOL-DIR 3523 stores a pointer indicating the corresponding PSCB 3524. Note that the allocated PSCB 3524 are excluded from the free PSCB queue 35240.

As a result, each page (slot) of the second-type LDEV is allocated to the PSCB 3424 indicated by the PSCB pointer 35234 of each entry in the VVOL-DIR 3523. The PSCB 3524 correspond to the slots of the first-type LDEV (logic devices 410) and, as a result, the second-type LDEV are allocated to the first-type LDEV (logic devices 410), and the virtual volume 460, which is the access target of the host computer 10, can be used as the target device.

Figure 10:
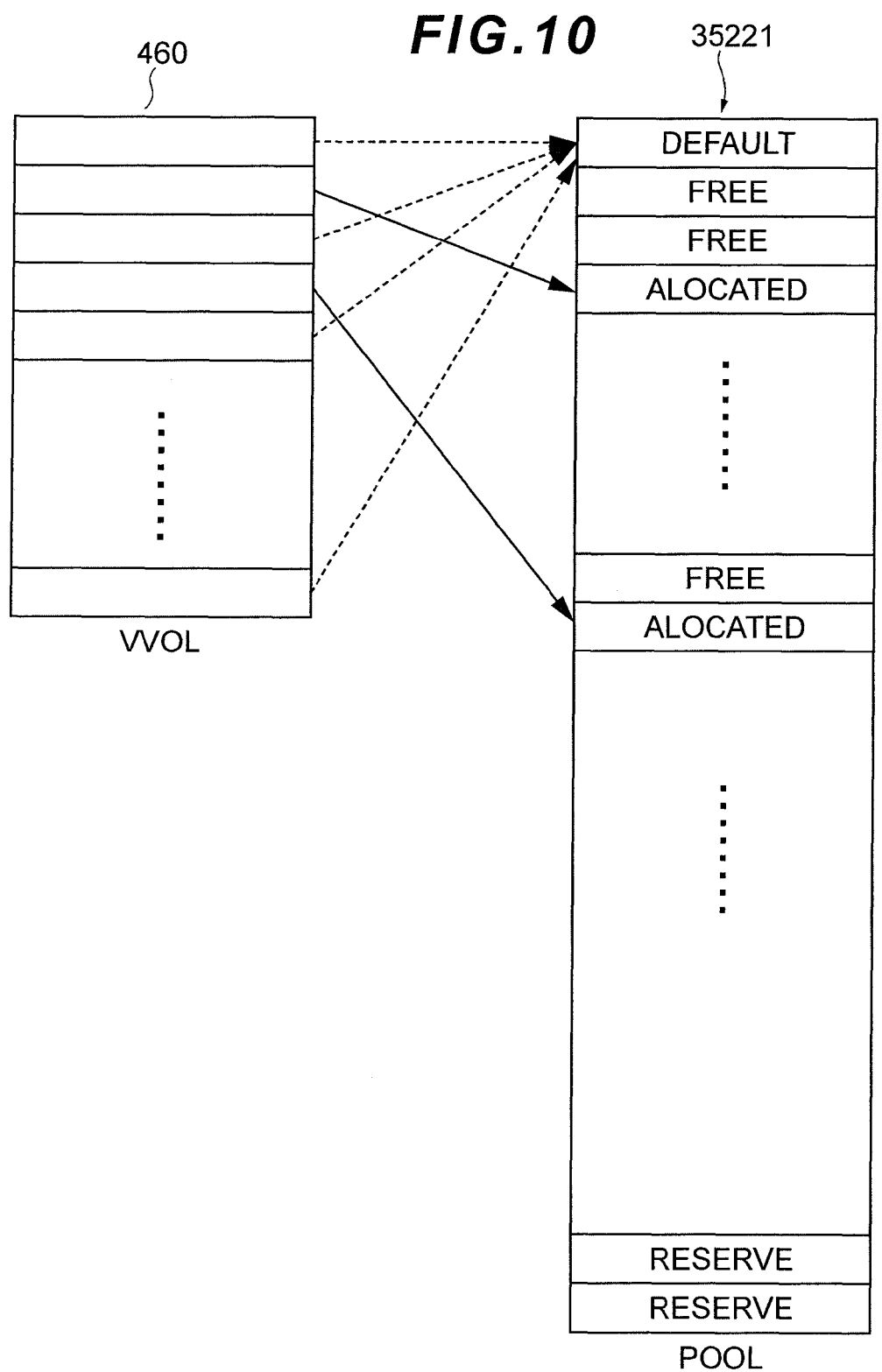
FIG. 10 A block diagram to illustrate the relationships between pools and the virtual volumes.

FIG. 10 is a block diagram to illustrate the relationships between pools and the virtual volume. The pool management table 35221 comprises a table for managing relationships between the second-type LDEV of the virtual volume 460 and the first-type LDEV (logic devices 410) of the pool volumes 450.

In the pool management table 35221, when a second-type LDEV of the virtual volume 460 has not been allocated to the pool volume 450, 'FREE' information is stored in correspondence with the second-type LDEV, and when a second-type LDEV of the virtual volume 460 has been allocated to the pool volume 450, 'ALLOCATED' information is stored in correspondence with the second-type LDEV.

Figure 11:
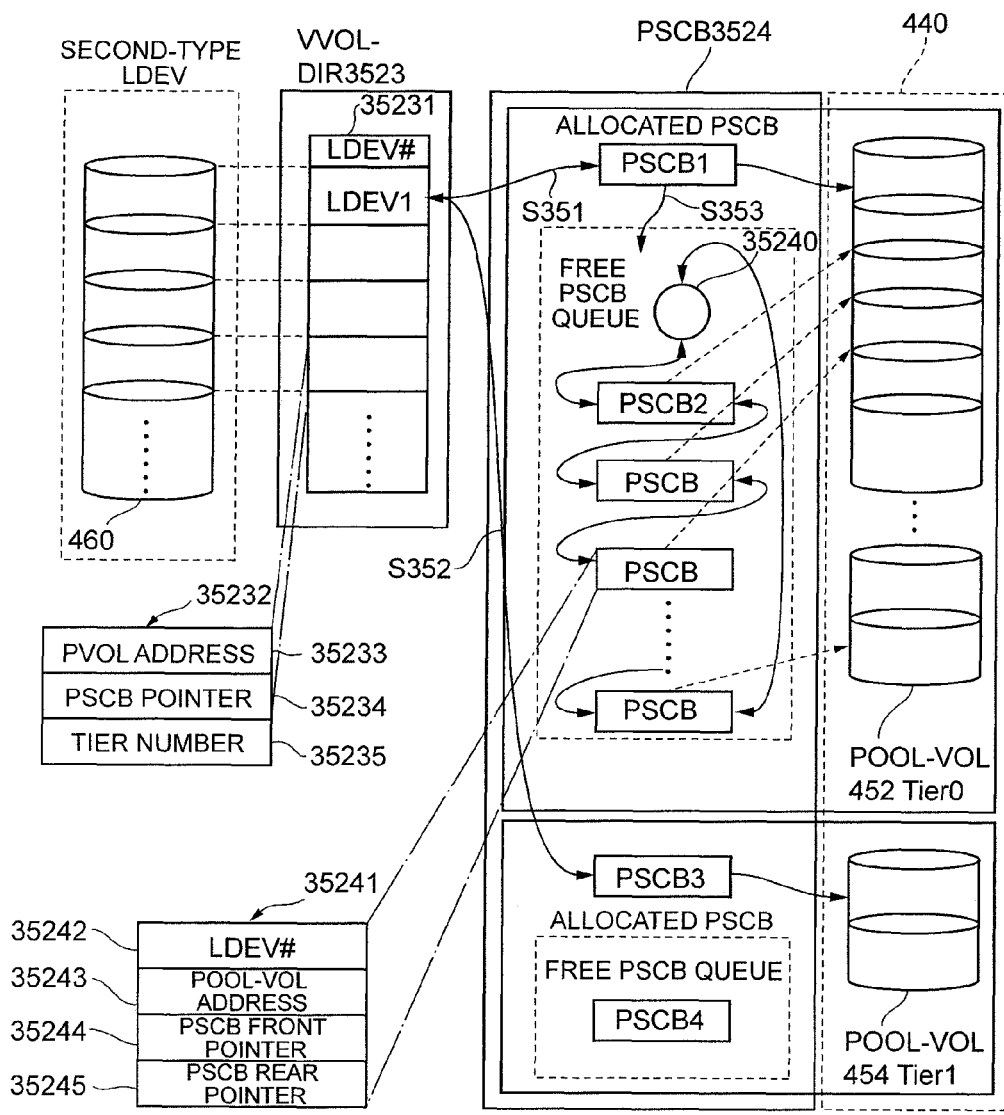
FIG. 11 A block diagram to illustrate the relationships between the PSCB and tiered pool volumes, and virtual volumes.

FIG. 11 is a block diagram to illustrate the relationships between the PSCB and tiered pool volumes, and virtual volumes.

If tiered pool volumes 450 are stored in the capacity virtualization pool 440, free PSCB are queued and managed for every tier and area is allocated to one LDEV 35231 for each page in a plurality of tiers. Here, the page unit method is managed as PSCB unit information. The PSCB pointer 35234 is information indicating which area in the pool volume 450 page data is stored in. The tier number 35235 is a tier number indicating which tier in the pool volume 450 page data is stored in.

Here, with regard to pool volumes, if a pool volume belonging to Tier0 is a pool volume 452 and a pool volume belonging to Tier1 is a pool volume 454, for example, a certain page of LDEV1 in the VVOL-DIR 3523 is allocated area of the pool volume 452 belonging to Tier0, and when addresses are managed by a PSCB1 of the PSCB 3524 (S351) and this page is migrated to Tier1, processing is executed by the controller 31 to acquire a PSCB3 of the PSCB 3524 from the free PSCB queue and copy the content of the PSCB1 to the PSCB3 (S352).

Thereafter, processing is executed by the controller 31 to connect the PSCB1 to the free PSCB queue 35240 (S353) in order to change the mapping of a certain page of the LDEV1 in the VVOL-DIR 3523 to the PSCB3 from the PSCB1 and return the PSCB1 to the free queue.

Note that page unit information also includes information acquired from the monitor. In this case, the frequency of access to the pages is monitored and managed at regular intervals. Furthermore, data stored in the pool volumes 450 may have information appended thereto for each pool page to enable a search to determine which data at which address of which virtual volume has been allocated.

Figure 12:
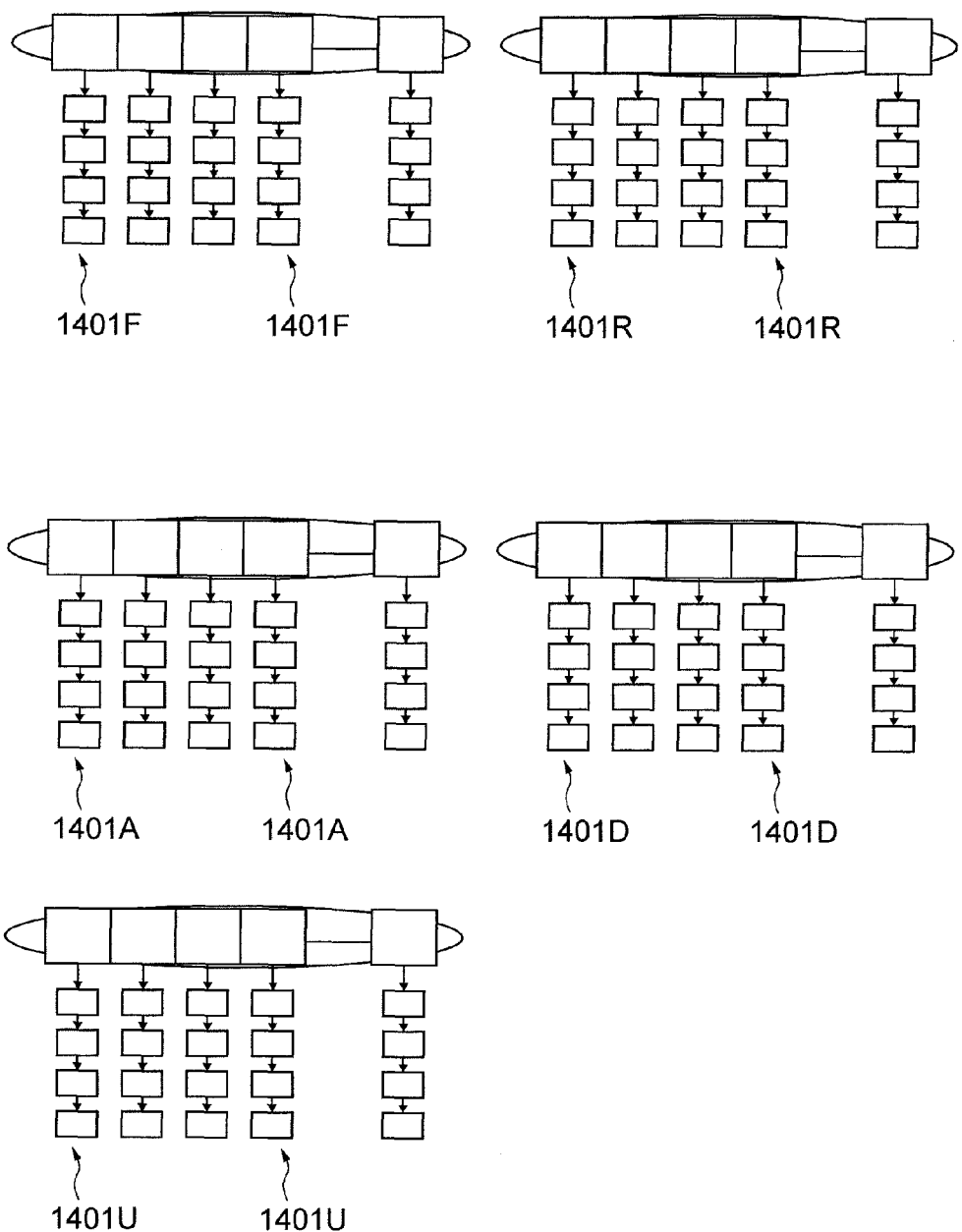
FIG. 12 A block diagram of PSCB used in tiered pool volumes.

FIG. 12 is a block diagram of PSCB used in tiered pool volumes.

If the tiered pool volumes 450 are stored in the capacity virtualization pool 440, for example when the pool volumes 450 are stored in the capacity virtualization pool 440 divided into five tiers, PSCB1401 F is used as the PSCB2524 of Tier0, PSCB1401R is used as the PSCB2524 of Tier1, PSCB1401A is used as the PSCB2524 of Tier2, PSCB1401D is used as the PSCB2524 of Tier3, and the PSCB1401U is used as the PSCB2524 of Tier4.

Figure 13A:
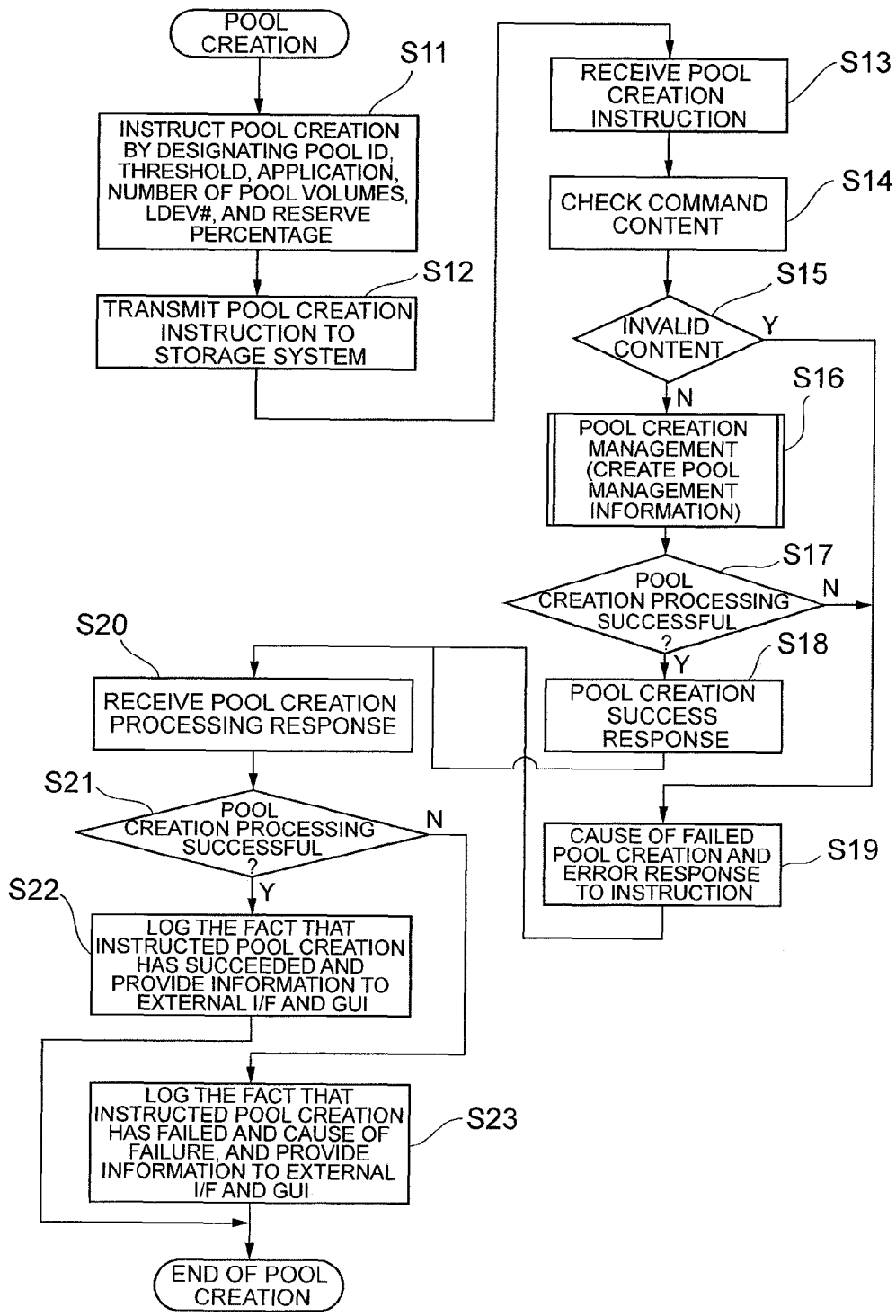
FIG. 13A A flowchart illustrating pool creation processing.

The pool creation processing will be explained next with reference to the flowchart in FIG. 13A. The CPU 230 of the storage system management apparatus 20 runs the management program (management software), instructs that pool creation be executed by designating a pool ID (IDentifier), threshold, application, the number of pool volumes, logic device numbers (LDEV#), reserve (reserve devices different from the target device) ratios (S11), and transmits a pool creation instruction to the storage system 30 (S12).

When the network adapter 320 of the storage system 30 receives a pool creation instruction, the processor 360 of the controller 31 runs the command control program 3501 to start the following processing.

First, the processor 360 receives the pool creation instruction (S13), checks the content of the command appended to the pool creation instruction (S14), judges whether there is invalid content (S15), migrates to pool creation processing when the command has no invalid content (S16), determines whether or not pool creation processing has been successful (S17), and when pool creation processing has succeeded, transmits a response to the effect that pool creation has succeeded to the storage system management apparatus 20 (S18).

On the other hand, upon judging in S15 that the command content includes invalid content, and upon judging in step S17 that pool creation processing has failed, the processor 360 transmits the cause of pool creation failure and an error response to the instruction to the storage system management apparatus 20 (S19), and ends the processing of this routine.

Upon receiving a pool creation processing response from the storage system 30 (S20), the CPU 230 of the storage system management apparatus 20 judges whether or not pool creation processing has succeeded based on the content of the received response (S21), and when pool creation processing has succeeded, logs the fact that the instructed pool creation has succeeded, provides information to an external I/F (InterFace) or GUI (Graphical User Interface) (S22), and ends the processing of this routine.

When it is judged in step S21 that pool creation processing has failed, the CPU 230 logs the fact that the designated pool creation has failed as well as the cause of failure, provides information to the external I/F or GUI (S23), and ends the processing of this routine.

Figure 13B:
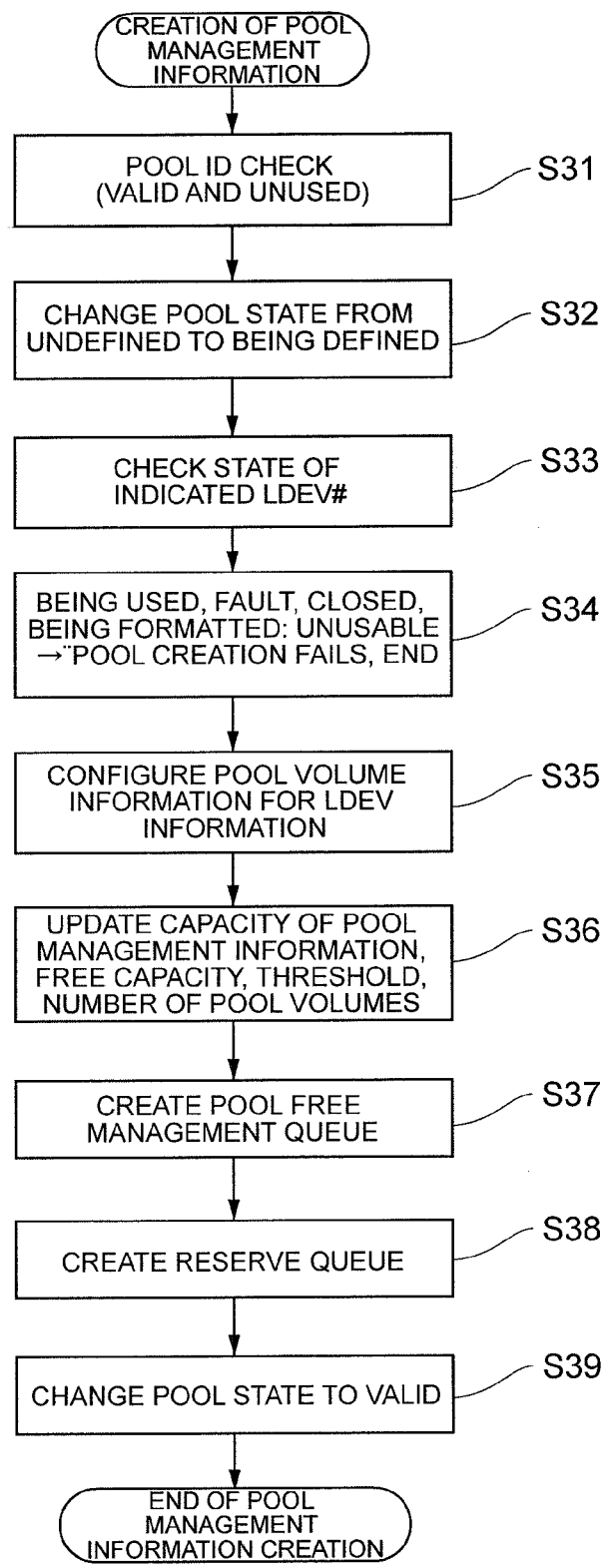
FIG. 13B A flowchart illustrating pool management information creation processing.

Pool management information creation processing will be explained next with reference to the flowchart in FIG. 13B.

This processing is pool management information creation processing which is to be executed in the pool creation processing in step S16, and is started as a result of the processor 360 running the pool control program 3507.

The processor 360 performs a pool ID check, checking, for example, whether the pool ID is valid and unused (S31), changes the state of the pool (capacity virtualization pool 440) from undefined to being defined (S32), and checks the state of the designated logic device (LDEV) (S33), and since the checked logic device is inoperable when it is being used, is subject to a fault, is closed or being formatted and so on, the processor 360 ends the processing given that pool creation would fail, and executes the following processing on the other logic devices (S34).

The processor 360 then configures pool volume information for the LDEV information (S35), updates the capacity of the pool management information, the free capacity, the threshold, and the number of pool volumes (S36), then creates a pool free management queue (S37), creates a reserve queue (S38), changes the pool state to valid (S39), and ends the processing of this routine.

Figure 14A:
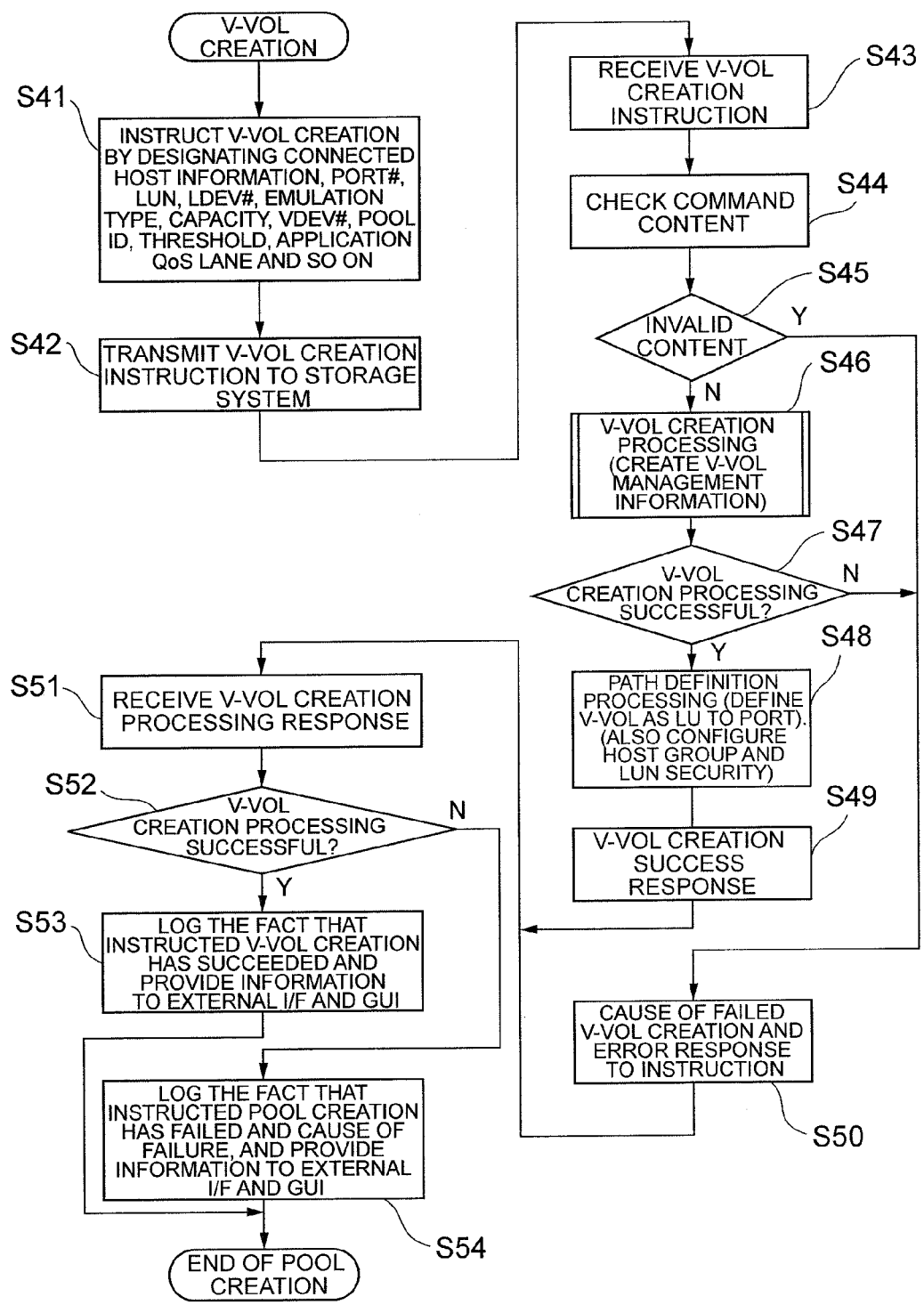
FIG. 14A A flowchart illustrating virtual volume creation processing.

The virtual volume (VOL) creation processing will be explained next with reference to the flowchart in FIG. 14A. The CPU 230 of the storage system management apparatus 20 runs a management program (management software), and starts the processing. The CPU 230 designates the connected host information, port numbers, LUN, logic device numbers (LDEV#), the emulation type, the capacity, the virtual device number (VDEV#), the pool ID, the threshold, the application QoS (Quality of Services) LANE and so forth, and instructs virtual volume creation (S41), and transmits a virtual volume creation instruction to the storage system 30 (S42).

Meanwhile, when the network adapter 320 of the storage system 30 receives a virtual volume creation instruction, the command control program 3501 is run by the processor 360, and the following processing is started.

First, the processor 360 receives a virtual volume creation instruction (S43), checks the content of the command assigned to the virtual volume creation instruction (S44), judges whether or not the command content is invalid content (S45), executes virtual volume creation processing when there is no invalid content (S46), and judges whether or not virtual volume creation processing has been successful (S47).

When it is judged in step S47 that virtual volume creation has succeeded, the processor 360 performs path definition processing, for example, defining a virtual volume as a logic unit (LU) for the port, configures a host group, logical unit number (LUN), and security (S48), and transmits a response to the effect that virtual volume creation has succeeded to the storage system management apparatus 20 (S49).

On the other hand, upon judging in step S45 that the command content includes invalid content, and upon judging in step S47 that virtual volume creation has failed, the processor 360 transmits the cause of virtual volume creation failure and an error response to the instruction to the storage system management apparatus 20 (S50), and ends the processing of this routine.

Upon receiving a virtual volume creation response from the storage system 30 (S51), the CPU 230 of the storage system management apparatus 20 judges whether or not virtual volume creation has succeeded based on the content of the received response (S52), and when virtual volume creation processing has succeeded, logs the fact that the instructed virtual volume creation has succeeded, provides information to an external I/F or GUI (S53), and ends the processing in the routine.

When it is judged that virtual volume creation processing has failed, the CPU 230 logs the fact that the instructed virtual volume creation has failed as well as the cause, provides information to the external I/F or GUI (S54), and ends the processing of this routine.

Figure 14B:
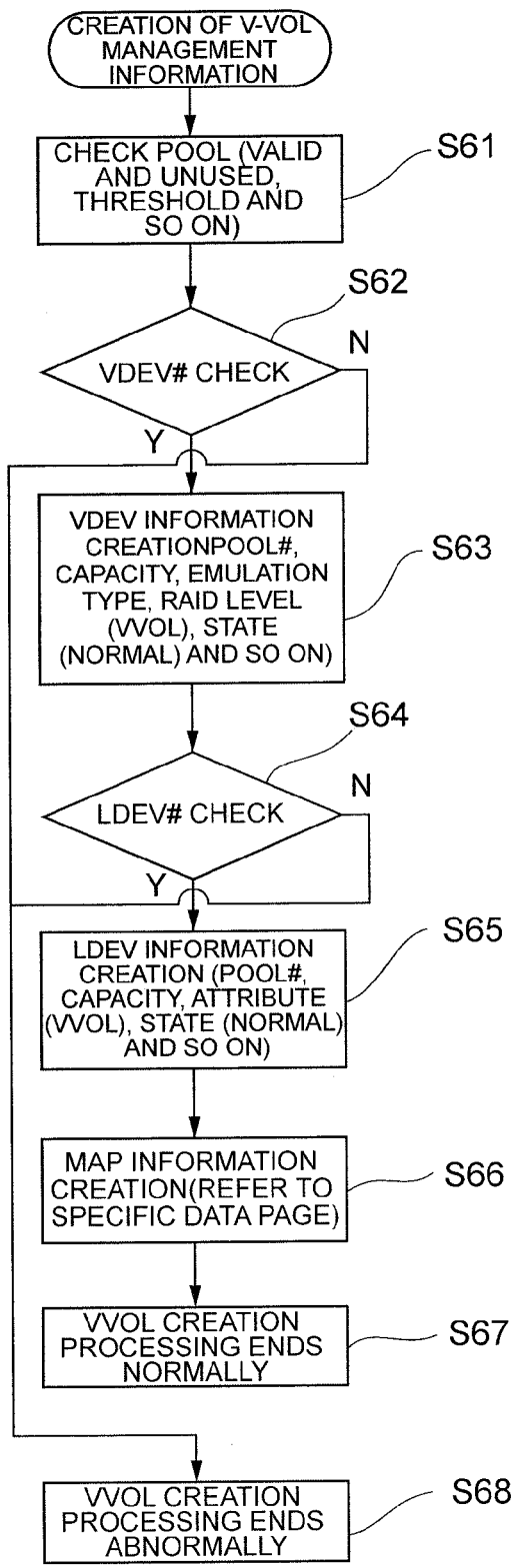
FIG. 14B A flowchart illustrating virtual volume management information creation processing.

Virtual volume management information creation processing will be explained next with reference to the flowchart in FIG. 14B. This processing is processing which is to be executed in the virtual volume creation processing in step S46 of FIG. 14A, and which is started as a result of the processor 360 of the controller 31 running the pool control program 3507.

The processor 360 performs, as a virtual volume check, for example, a check of whether or not the virtual volume is valid and unused, and checks the threshold or the like of the virtual volume (S61), checks whether or not the number of the virtual device (VDEV) which belongs to the virtual volume is correct (S62), and when the number of the virtual device is correct, creates as virtual device information creation processing, for example, the pool number, the capacity, the emulation type, the RAID level, the state (normal) and so on (S63), and then judges whether or not the logic device (LDEV) number is correct (S64).

When the number of the logical device (LDEV) is judged to be correct in step S64, the processor 360 then creates, as logic device information creation processing, information such as the pool number, the capacity, the attribute (virtual volume attribute), and the state (normal), for example (S65), and then creates, as map information creation processing, map information by referring to a specified data page (S66), executes processing to the effect that the virtual volume creation processing has ended normally (S67), and ends the processing in this routine.

However, when it is judged in step S62 that the number of the virtual device (VDEV) is incorrect or when it is judged in step S64 that the number of the logic device (LDEV) is incorrect, the processor 360 executes processing to the effect that the virtual volume creation processing has ended abnormally (S68), and ends the processing in this routine.

Figure 15A:
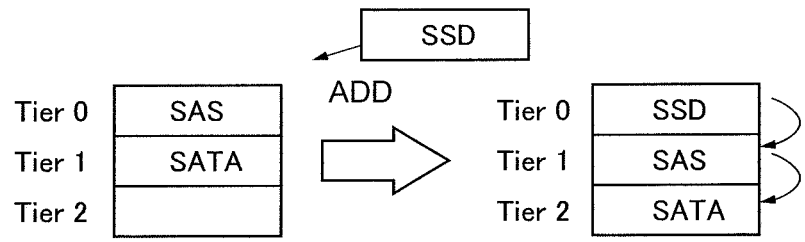
FIG. 15 A diagram illustrating Tier addition and deletion.
Figure 15B:
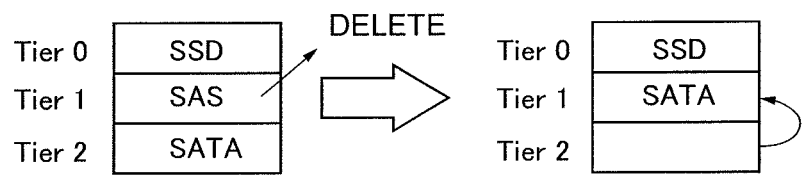

FIG. 15 next shows the management configuration when a physical device (PDEV) 34 is added or eliminated. When the pool volumes 450 stored in the capacity virtualization pool 440 are managed in tiers and the controller 31 uses SAS as the physical device 34 which belongs to Tier0 and SATA as the physical device 34 which belongs to Tier1, if an SSD is added as a physical device 34 with a higher performance level than these physical devices 34 as shown in (a), SSD is configured in Tier0, SAS is configured in Tier1, and SATA is configured in Tier2, and pool volumes 450 which correspond to the logical devices (LDEV) of these physical devices 34 are divided into three tiers and managed in tiers.

Conversely, if a SAS belonging to Tier1 is eliminated as shown in (b), the controller 31 manages the SATA configured in Tier2 after moving this SATA up to Tier1. In this case, the pool volumes 450 are tiered and managed in two tiers.

Here, in the storage system 30, the act of copying data within the storage system 30 will be referred to hereinafter as a 'local copy' and if the storage system 30 is connected to another storage system, the act of copying a copy of data of a logical volume in the storage system 30 to another storage system is known as a 'remote copy.'

Furthermore, in a local copy and remote copy, a set of a copy-source logical volume and a copy-destination logical volume will be referred to as a pair, and of the logical volumes which the pair comprises, for example, a logical volume which is an access target of the host computer 10 is called a primary logical volume (P-VOL), and a logical volume which is a target of a pair of primary logical volumes (P-VOL) will be referred to as a secondary volume (S-VOL).

When a new pair is formed, formation copy processing is executed. In this case, a copy source (primary logical volume) and copy destination (secondary volume) of the newly formed pair are designated. At this point in time, the secondary volume does not store the same data as the primary logical volume; however, by executing a formation copy in which the data of the copy source (primary logical volume) is subsequently copied sequentially to the copy destination (secondary volume), the same data as the primary logical volume (P-VOL) is stored in the secondary volume (S-VOL). A state where formation copying is executed is a state 'formation copying in progress.'

A state where data is copied and the same data is stored in the primary logical volume (P-VOL) and secondary volume (S-VOL), that is, a state where data is duplicated, is known as a 'synchronized' state. In a 'synchronized' state, when data of a primary logical volume (P-VOL) is updated, the updated data is copied to the secondary volume (S-VOL). This copy is called an update copy.

A state where a data copy is stopped is a 'suspend' state. In a 'suspend' state pair, data which is different from the primary logical volume (P-VOL) is sometimes also stored in the secondary volume (S-VOL). In a 'suspend' state and a 'formation copy in progress' state, differential management using a differential bitmap is executed.

For example, when the pair to which the primary logical volume (P-VOL) belongs is in a 'synchronized' state, all the bits of the differential bitmap are 'OFF (invalid) or '0.' When the pair to which the primary logical volume (P-VOL) belongs is in the 'suspend' state, when data of the primary logical volume (P-VOL) is updated as a result of access from the host computer 10, the bit corresponding to the storage area to which the data is written is updated to 'ON (valid) or '1.'

Meanwhile, when a 'SPRIT' command is issued as a state transition command linked to a pair, processing to change a 'synchronized' state pair to a 'suspend' state is executed. When SPRIT processing is executed, data copying from the primary logical volume (P-VOL) to the secondary volume (S-VOL) is not executed.

Furthermore, when a 're-sync' command is issued as a state transition command, processing to change a 'suspend' state pair to a 'synchronized' state is executed. When re-sync processing is executed, among the data stored in the primary logical volume (P-VOL), data that differs at least from the data stored in the secondary volume (S-VOL) is copied to the secondary volume (S-VOL). As a result, data which is the same as that of the primary logical volume (P-VOL) is stored in the secondary volume (S-VOL).

Furthermore, when a 'RESTORE' or 'REVERSE-re-sync' command is issued as a state transition command, processing to change a 'suspend' state pair to a 'synchronized' state is executed. When restore or reverse-re-sync processing is executed, among the data stored in the secondary volume (S-VOL), data that differs at least from the data stored in the primary logical volume (P-VOL) is copied to the primary logical volume (P-VOL). As a result, data which is the same as that of the secondary volume (S-VOL) is stored in the primary logical volume (S-VOL).

Figure 16:
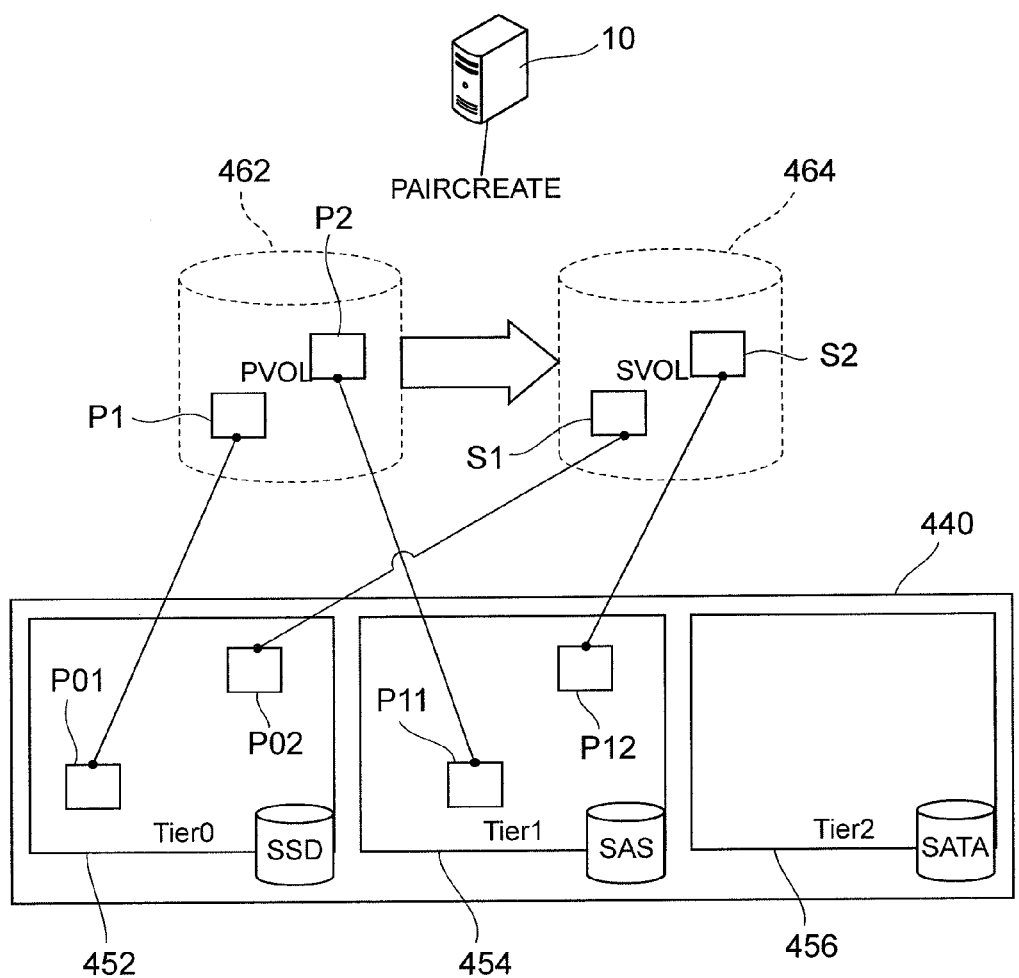
FIG. 16 A block diagram to illustrate pair request processing.

Processing when a pair-related command is issued to the storage system 30 from the host computer 10 will be explained next with reference to FIGS. 16 to 26. First, as shown in FIG. 16, the controller 31 manages volumes which the virtual volume 460 comprises, namely, an operational volume which is an access target of the host computer 10 as a primary logical volume (PVOL) 462, a virtual volume which is to be paired with the primary logical volume 462 as the secondary logical volume (SVOL) 464, allocates a plurality of primary pages P1, P2, ... to the virtual storage area of the primary logical volume 462, and allocates and manages a plurality of secondary pages S1, S2 ... to the virtual storage area of the secondary logical volume 464.

Furthermore, the controller 31 tiers and manages the pool volumes stored in the capacity virtualization pool 440 in three tiers. For example, the controller 31 tiers and manages the pool volumes such that a pool volume corresponding to the SSD-comprising logic device (LDEV) 410 belonging to Tier0 is pool volume 452, a pool volume corresponding to the SAS-comprising logic device (LDEV) 410 belonging to Tier1 is pool volume 454, and a pool volume corresponding to the SATA-comprising logic device (LDEV) 410 belonging to Tier2 is a pool volume 456, allocates a plurality of pool pages P01 and P02 to the pool volume 452, allocates a plurality of pool pages P11 and P12 to the pool volume 454, and allocates a plurality of pool pages (P21, P22, . . . ) to the pool volume 456.

Here, when the controller 31 receives, as a pair-related command from the host computer 10, a command relating to pair formation (pair create) which pairs the primary logical volume 462 with the secondary logical volume 464, the controller 31 allocates pages designated by the command, allocating, for example, the pool pages P01, P11 to the primary pages P1, P2 and the pool volumes P02, P12 to the secondary pages S1, S2 of the secondary logical volume 464.

In other words, primary page P1 and secondary page S1 are paired pages and primary page P2 and secondary page S2 are paired pages, and therefore pool pages which belong to the same tier as the pool pages allocated to the primary pages P1, P2 are allocated to the secondary pages S1, S2 paired with the primary pages P1, P2.

Thereafter, a state is assumed where read access or write access to the primary logical volume 462 and secondary logical volume 464 are prohibited, and the data of the primary pages P1 and P2 are copied to the secondary pages S1 and S2 respectively as pre-update data. As a result, the content of the data of the primary pages P1, P2 and the secondary pages S1, S2 is identical.

Figure 17:
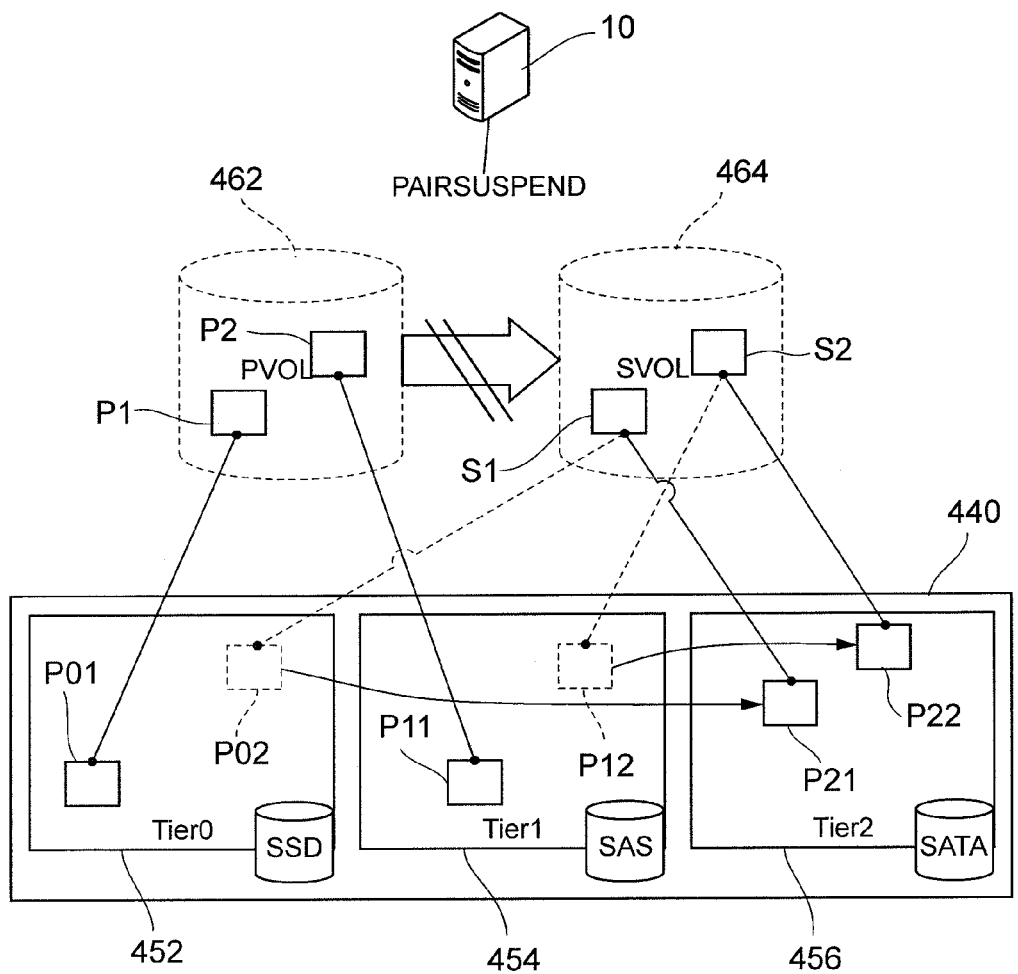
FIG. 17 A block diagram to illustrate pair suspend processing.

Subsequently, when, after receiving a pair created-related command, a pair suspend command is received as a pair-related state transition command, the controller 31 stops an update copy between the primary logical volume 462 and the secondary logical volume 464, as shown in FIG. 17. At this time, the host computer 10 is able to perform read access or write access on the primary logical volume 462 or the secondary logical volume 462.

Upon receiving a pair suspend command, because the data of the secondary pages S1, S2 need not be stored in the Tier0 SSD or Tier1 SAS, when migration from the SSD or SAS to the lower cost SATA is instructed in the suspend command, the controller 31 migrates the pool page P02 in the pool volume 452 to the pool volume 456 and makes this page the pool page P21, migrates the pool page P12 of the pool volume 454 to the pool volume 456 and makes this page the pool page P22, and then associates the secondary page S1 with the pool page P21, and associates the secondary page S2 with the pool page P22.

The pool page P02 which belongs to Tier0 and the pool page P12 which belongs to Tier1 can accordingly be migrated to the pool pages P21, P22 respectively which belong to Tier2 in response to a state transition command. In this case, when the host computer 10 write-accesses the secondary pages S1, S2 of the secondary logical volume 464, the write data is stored in the SATA.

Furthermore, when, after a pair create command has been issued to the storage system 30, a pair suspend command is issued, the host computer 10 is able to read-access or write-access the primary logical volume 462 and the secondary logical volume 464 of the storage system 30.

Figure 18:
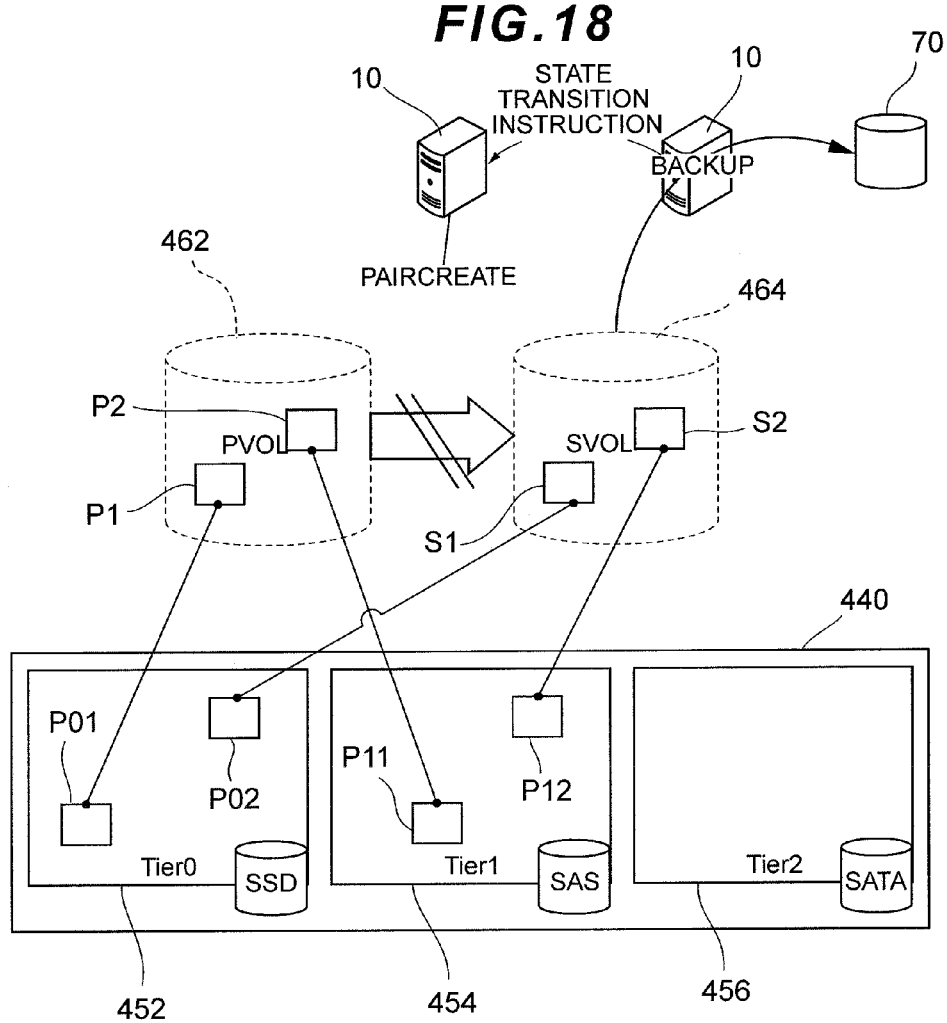
FIG. 18 A block diagram to illustrate other pair suspend processing.
Figure 19:
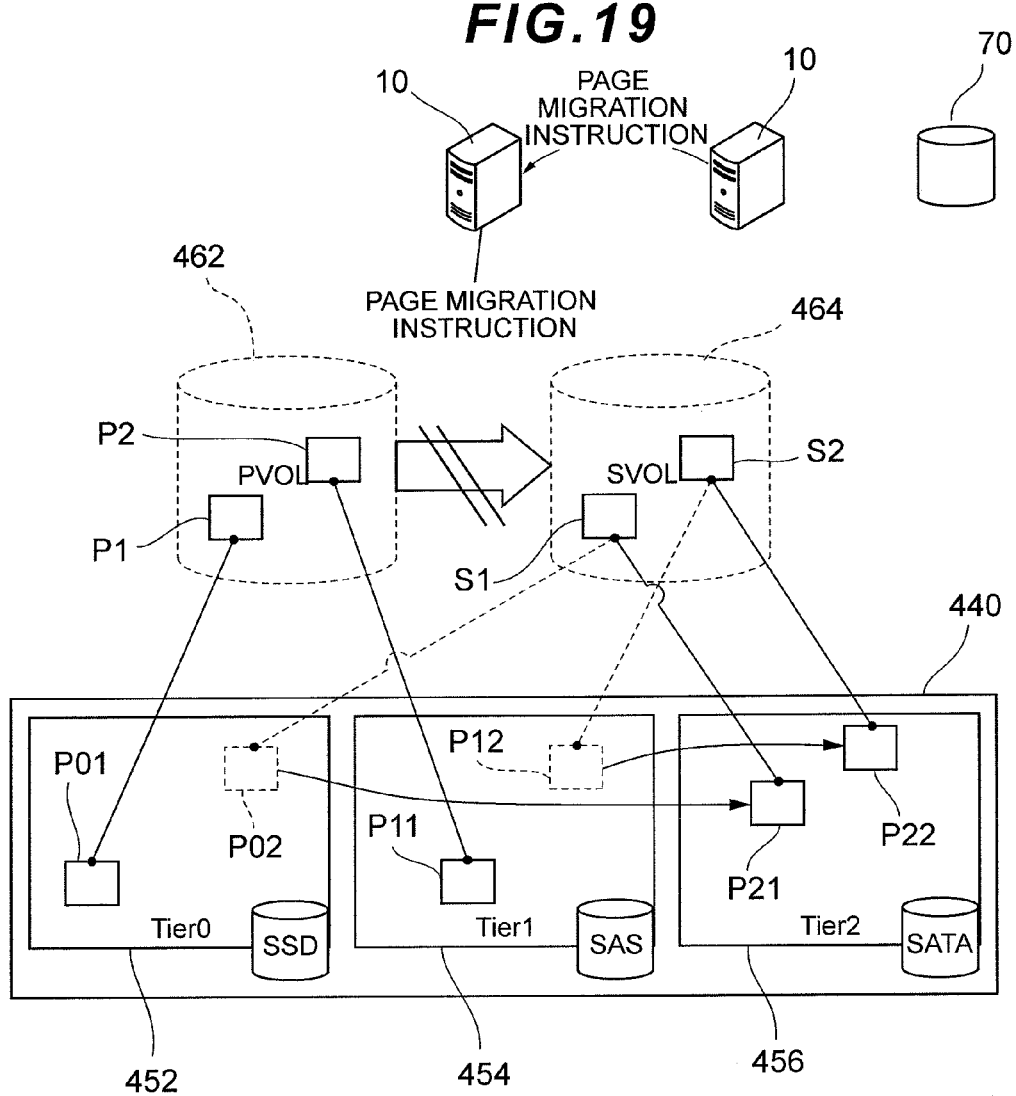
FIG. 19 A block diagram to illustrate pair suspend processing due to page migration.

At this time, as shown in FIG. 18, when a backup to an external device such as tape media 70, for example, is instructed by the pair suspend command, the controller 31 executes processing to backup data stored in the secondary pages S1, S2 to the tape media 70.

Thereafter, when a pair suspend command is received as a state transition command and a page migration instruction is contained in the pair suspend command, the controller 31 executes page migration processing in accordance with the page migration instruction For example, the controller 31 migrates the pool page P02 in the pool volume 452 to the pool volume 456 and makes this page the pool page P21, migrates the pool page P12 of the pool volume 454 to the pool volume 456 and makes this page the pool page P22, and then associates the secondary page S1 with the pool page P21, and associates the secondary page S2 with the pool page P22.

The pool page P02 which belongs to Tier0 and the pool page P12 which belongs to Tier1 can accordingly be migrated to the pool pages P21, P22 respectively which belong to Tier2 in response to a state transition command.

Figure 20:
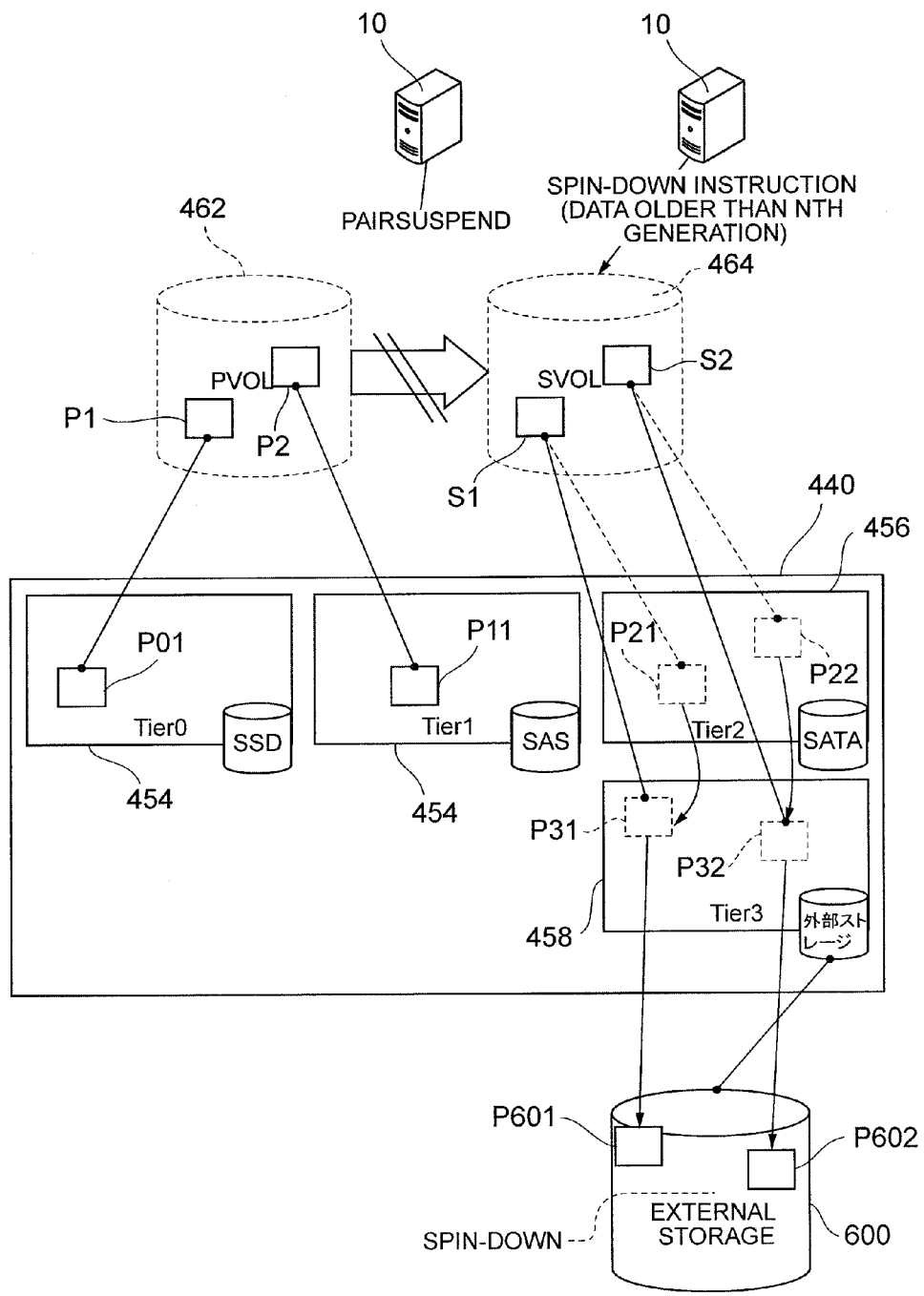
FIG. 20 A block diagram to illustrate pair suspend processing due to a spin-down instruction.

When, after receiving a pair suspend command as a state transition command, a command to spin down a physical device which belongs to the external physical device 600 is received as a command containing a spin-down instruction, the controller 31 executes processing in accordance with the command instruction as shown in FIG. 20.

Thereupon, the controller 31 stores, as a spin-down instruction, data older than the Nth generation such as the fifth generation, for example, in the external physical device 600, and when an instruction to spin-down the external physical device is received, stores a pool volume 458 corresponding to the external physical device 600 as a pool volume in the capacity virtualization pool 440, allocates pool pages P31, P32 to the pool volume 458, and associates the pool pages P31, P32 with the pages P601, P602 configured in the logical device of the external physical device 600.

Thereafter, when the secondary pages S1 and S2 are associated with the pool pages P21, P22 in Tier2, the controller 31 executes processing to associate the secondary pages S1, S2 with the pool pages P31, P32, migrates data earlier than the fifth generation stored in the secondary pages S1, S2 to the pages P601, P602 of the external physical device 600 via the pool pages P31, P32, and spins down the external physical device 600 in which pre-fifth generation data is stored to reduce power consumption.

Figure 21:
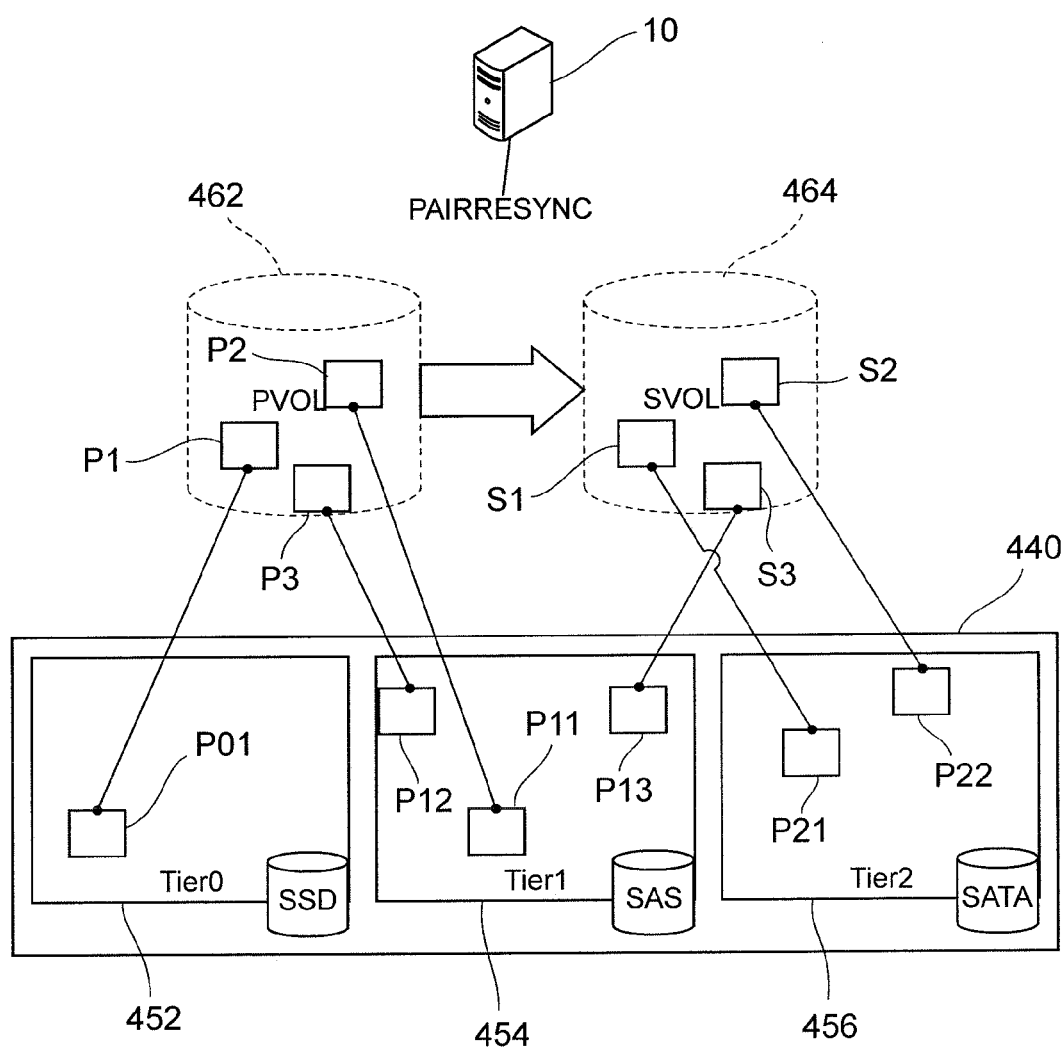
FIG. 21 A block diagram to illustrate pair re-synchronization processing.

Thereafter, if a pair suspend command is received, when a pair re-sync (re-synchronization) command is received as a state transition command, the controller 31 executes processing in accordance with the pair re-sync command as shown in FIG. 21.

In this case, when, after a pair suspend command is received, the data of the primary logical volume 462 is updated and a primary page P3 is added as a page for storing differential data, and the primary page P3 is associated with the pool page P12, the controller 31 configures a secondary page S3 in the secondary logical volume 464 as a secondary page which is paired with the primary page P3, allocates a pool page P13 which belongs to the same tier as the pool page P13 to the secondary volume S3, and copies data of the primary page P3 to the secondary page S3. Note that it is assumed that the data of the secondary pages S1, S2 is stored in the pool pages P21, P22.

Figure 22:
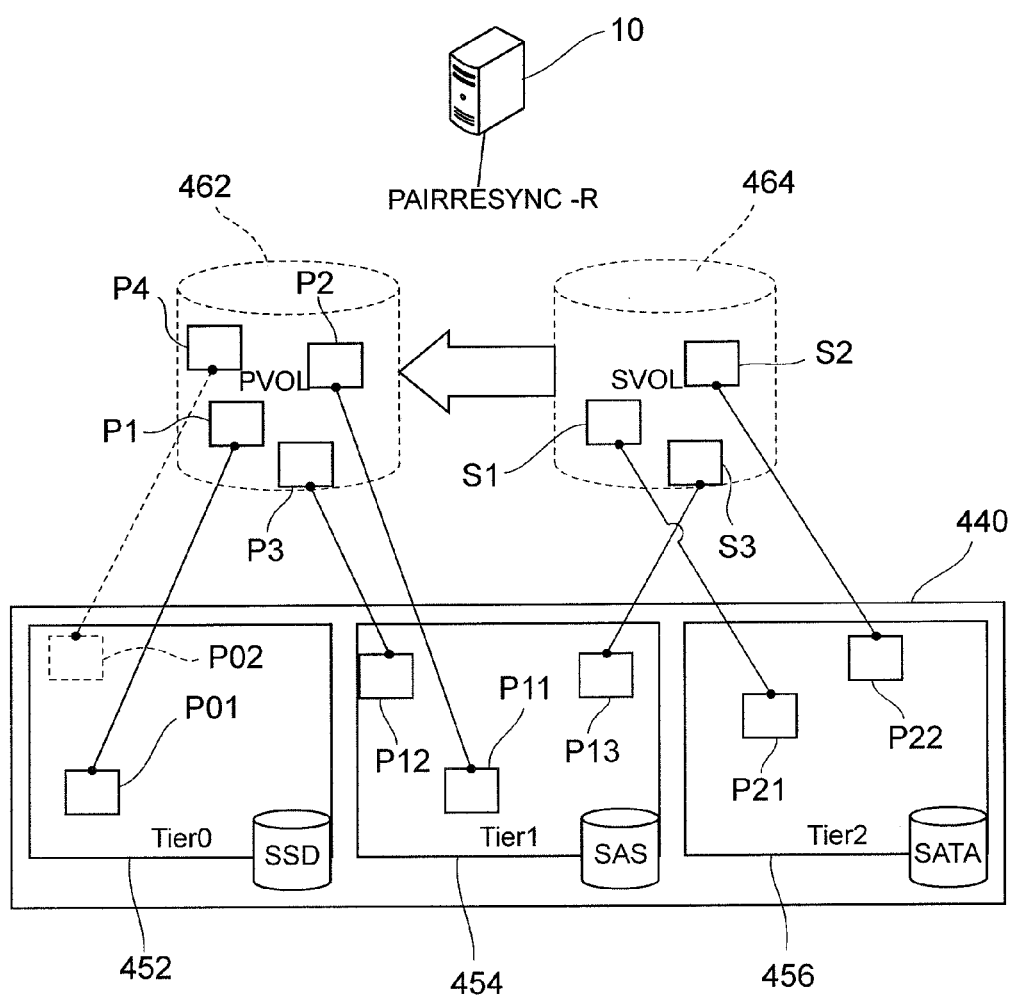
FIG. 22 A block diagram to illustrate restore processing.

The processing when the controller 31 receives a pair re-sync reverse (restore) command will be described next with reference to FIG. 22. When, after a pair suspend command is received, a pair re-sync reverse (restore) command is received as a state transition command, the controller 31 performs restore processing to restore the data backed up to the secondary logical volume 464 to the primary logical volume 462.

Here, for example, S1, S2, and S3 exist in the secondary logical volume 464 as secondary pages, and the secondary page S1 is associated with the pool page P21, the secondary page S2 is associated with the pool page P22, and the secondary page S3 is associated with the pool page P13. When, in this state, data of the secondary pages S1, S2, and S3 is copied to the primary volume 462, the data of secondary page P1 is copied to the primary page P1, data of the secondary page S2 is copied to the primary page P2, and data of the secondary page S3 is copied to the primary page P3.

Here, when the controller 31 receives the pair create command, if the primary page P1 belongs to the pool volume 452 which corresponds to the Tier0 SSD, processing to map the primary page P1 to the pool page P01 is executed by the controller 31. Furthermore, when the controller 31 receives the pair create command, if the primary page P2 belongs to the pool volume 454 which corresponds to the Tier1 SAS, processing to map the secondary page P2 to the pool page P11 is executed by the controller 31.

In addition, when, after restoration, a page on which differential data is stored still exists in the primary logical volume 462 as the primary page P4, the differential data stored on the primary page P4 is returned to a temporally preceding state as a result of the restore processing, and is therefore unnecessary. The controller 31 therefore frees the pool page P02 allocated to the primary page P4 and deletes the allocation.

Figure 23:
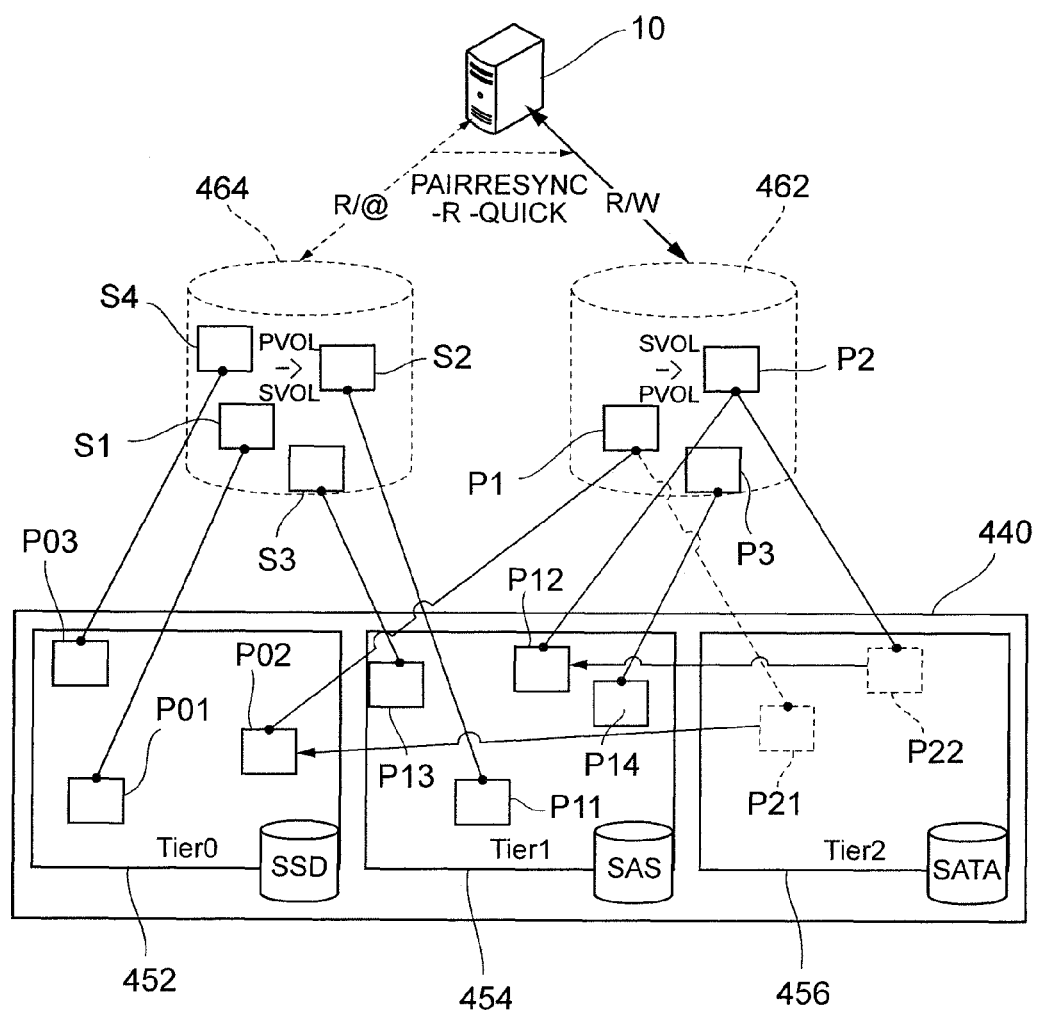
FIG. 23 A block diagram to illustrate quick re-sync processing.

The processing when the controller executes a quick restore command as a state transition command will be described next with reference to FIG. 23.

When a quick restore command is received from the host computer 10, the controller 31 executes a configuration change in which the primary logical volume 462 is made the secondary logical volume and the secondary logical volume 464 is made the primary logical volume, and then executes processing in response to the command from the host computer 10 to make the volumes which have undergone a configuration change as the access destination.

Here, as a result of the host computer 10 accessing the primary logical volume 464 or the secondary logical volume 464 of the storage system 30 after issuing the quick restore command, the controller 31 is able to obtain the same data as when executing restore processing without executing a pair copy due to the pair request, thereby enabling faster access to the storage system 30.

In this case, the pool pages P02, P12, and P14 are allocated to the new primary pages P1, P2, and P3 respectively, and pool pages P01, P11, P13, and P03 are allocated to the new secondary pages S1, S2, S3, and S4. In addition, the pool page P22 is migrated to the pool volume 454 and managed as the pool page 12, and the pool page P21 is migrated to the pool volume 452 and managed as the pool page P02.

Figure 24:
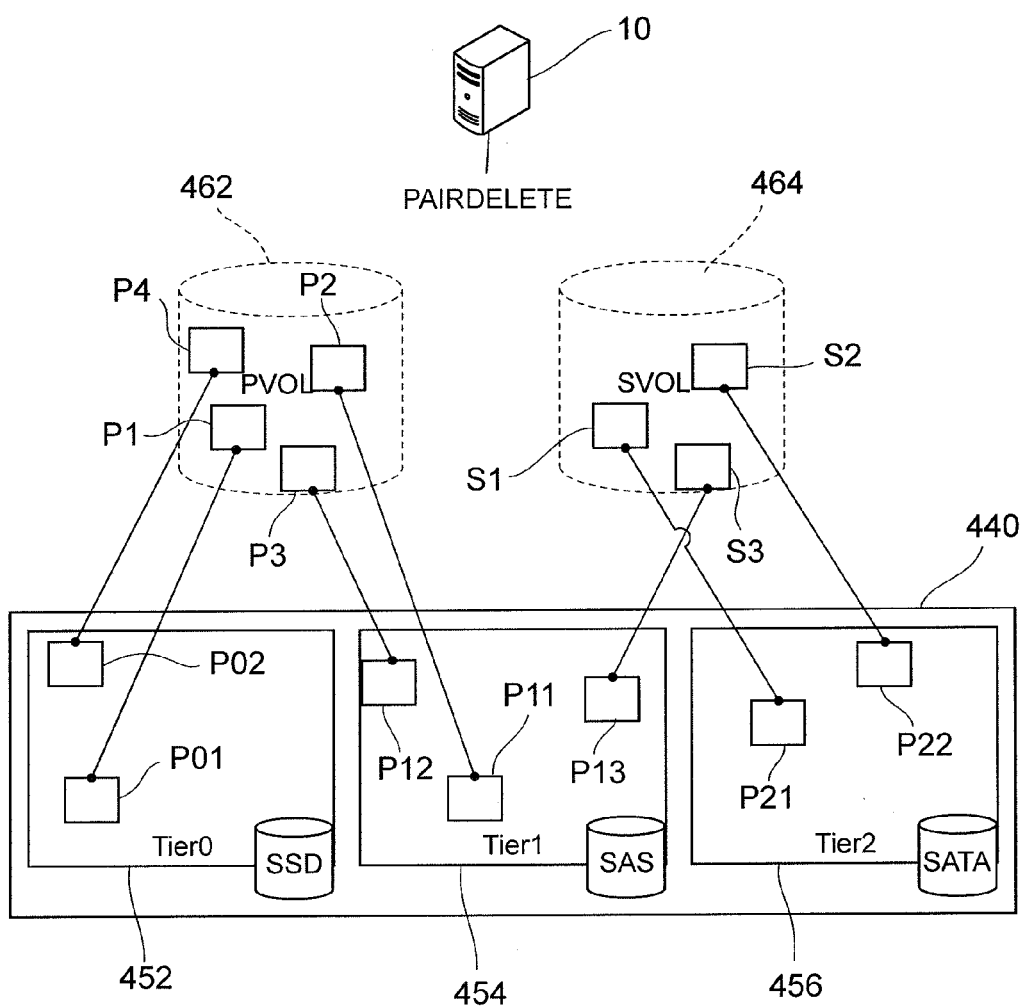
FIG. 24 A block diagram to illustrate pair deletion processing.

The processing when the controller receives a pair delete command as a state transition command will be described next with reference to FIG. 24.

Upon receiving a pair delete command as a state transition command, the controller 31 deletes the relationship whereby the primary logical volume 462 and the secondary logical volume 464 are paired, and deletes the relationship whereby the primary pages P1, P2, and P3 are paired with the secondary pages S1, S2, and S3 respectively. Here, the controller 31 comes to execute processing in accordance with subsequent commands in a state of holding correspondence relationships between the primary pages P1, P2, P3, and P4 and the pool pages P01, P11, P13, and P02, and correspondence relationships between the secondary pages S1, S2, and S3 and the pool pages P21, P22, and P13.

Figure 25:
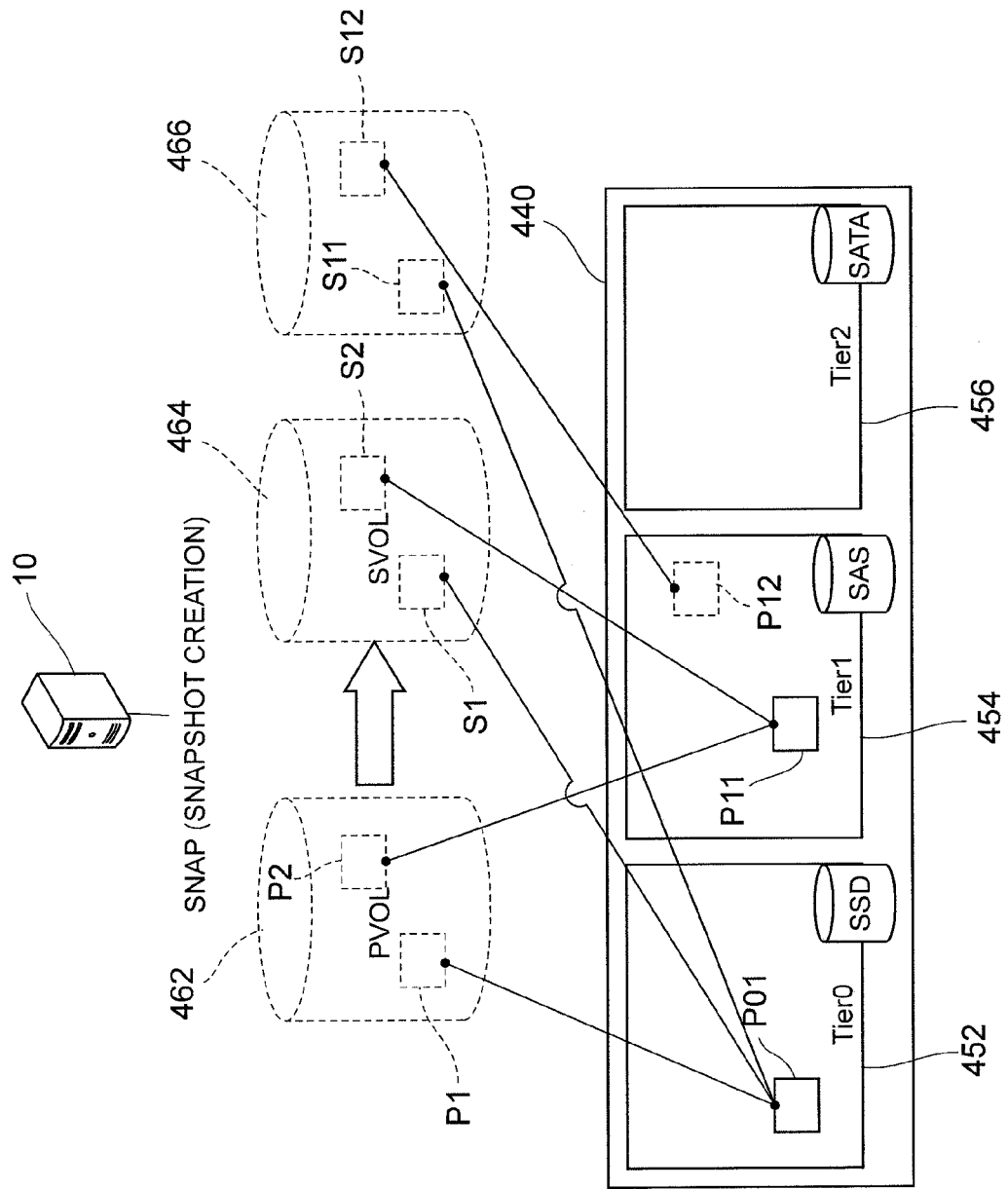
FIG. 25 A block diagram to illustrate snapshot creation processing.

The processing when the controller receives a snapshot creation command as a state transition command will be described next with reference to FIG. 25. Upon receiving the snapshot creation command, the controller 31 creates a secondary logical volume 466 in addition to the secondary logical volume 464 and allocates the secondary volumes S11, S12 to the secondary logical volumes 466; when the pool page P01 is allocated to the primary page P1 and secondary page S1, the controller 31 allocates the pool page P01 to the secondary page S11; and when the pool page P11 is allocated to the primary page P2 and secondary page S2, the controller 31 allocates the pool page P12 in the same tier to the secondary page S12.

The controller 31 then copies the data obtained in the snapshots on the primary pages P1 and P2 respectively to the secondary pages S1, S2, and S11.

When subsequently a pair suspend command is received and the primary logical volume 462 and secondary logical volume 464 enter a pair suspend state, the host computer 10 is capable of write-accessing the primary logical volume 462 or secondary logical volumes 464, 466.

Figure 26:
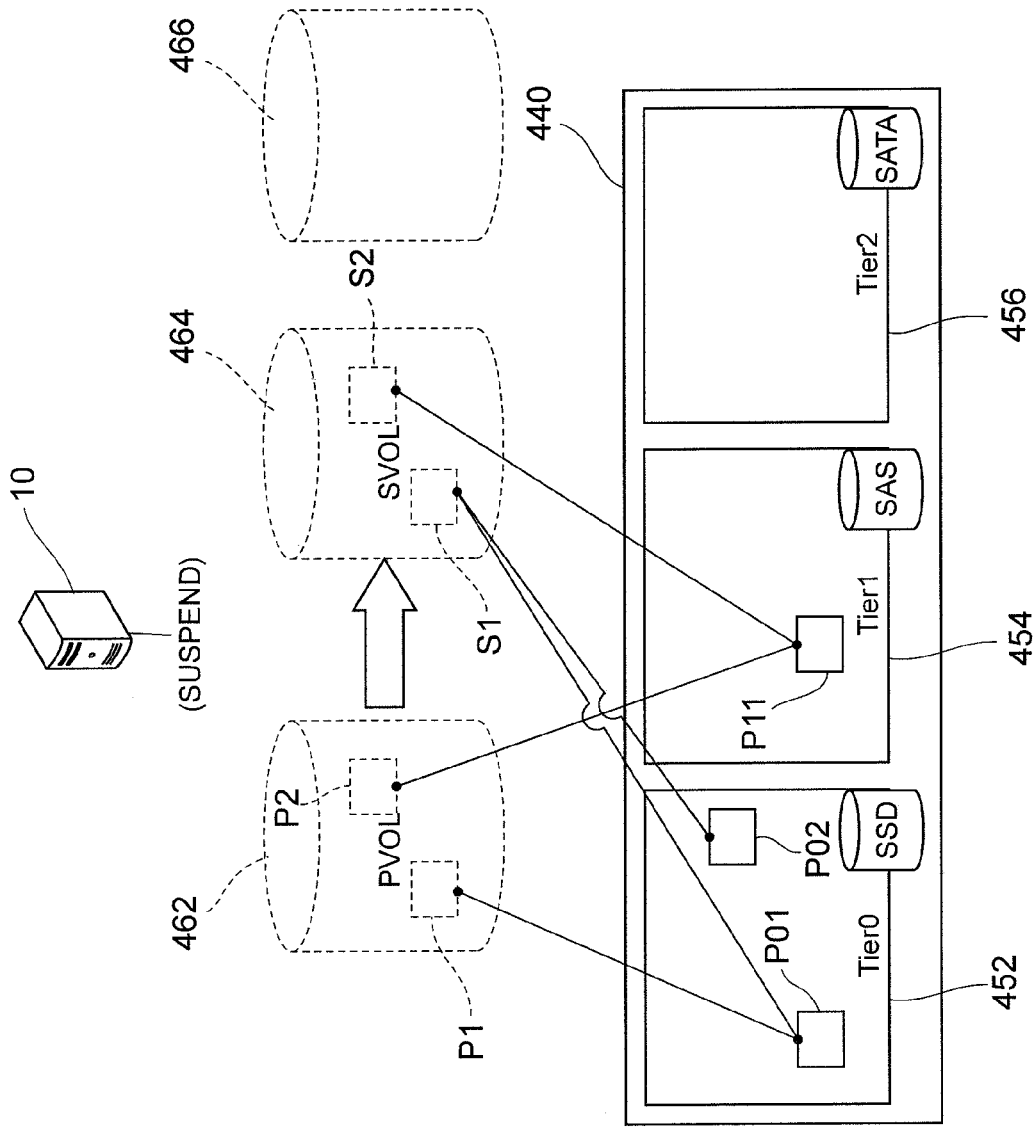
FIG. 26 A block diagram to illustrate suspend processing after snapshot creation processing.

More specifically, as shown in FIG. 26, when a pair suspend command is input after snapshot creation processing, the controller 31 receives a request to write to the primary logical volume 462 or secondary logical volumes 464, 466. Here, if there is write access to the primary page P1, for example, when pre-write access data is stored on the secondary page S1, the controller 31 copies data of the secondary page S1 to the pool page P02 which belongs to the same tier as the pool page P01 allocated to the primary page P1 and changes the mapping destination.

Note that when the pair suspend command includes an instruction to migrate pre-write data to Tier1 or Tier2, pre-write data can also be copied from the secondary page S1 to the pool page of the pool volume 454 which belongs to Tier1 or to the pool page of the pool volume 456 which belongs to Tier2.

Figure 27A:
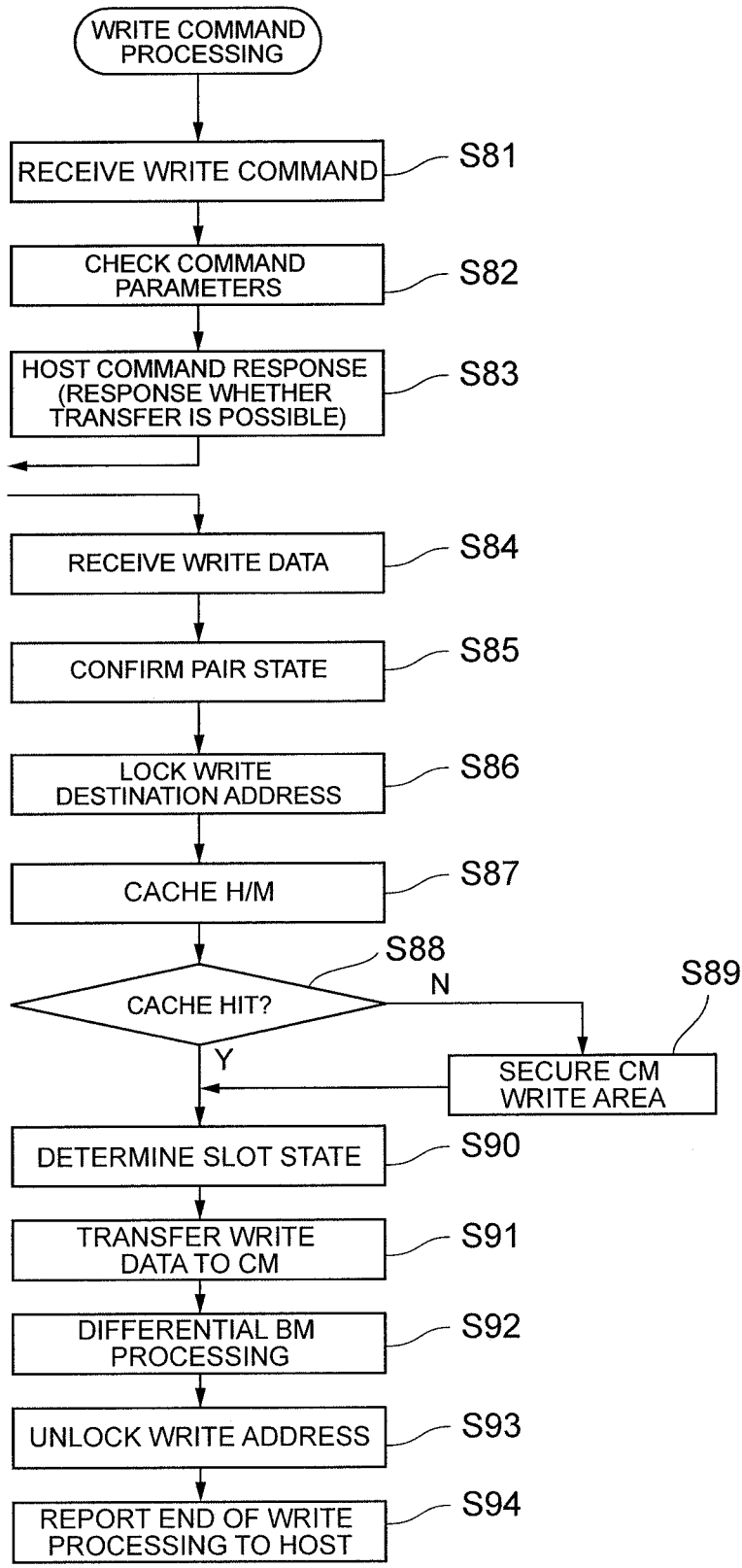
FIG. 27A A flowchart illustrating write command creation processing.

Primary logical volume and secondary logical volume write processing will be explained next with reference to the flowchart in FIG. 27.

This processing is started as a result of the processor 360 of the controller 31 running the command control program 3501. First, the processor 360 receives a write command from the host computer 10 (S81), checks the parameters of the received write command (S82), and transmits a response relating to whether transfer is possible based on the result of this check to the host computer 10 as a host command response (S83).

Thereafter, upon receiving write data from the host computer 10 (S84), the processor 360 confirms the pair state of the primary logical volume 462 and the secondary logical volume 464 (S85), locks the write destination address (S86), performs judgment processing to determine whether or not write data exists in the storage cache memory 32, that is, performs cache hit (H) or cache miss (M) judgment processing (S87), and judges whether or not there is a cache hit (S88).

When there is no cache hit, the processor 360 then secures a write area in the storage cache memory 32 (S89) and then shifts to the processing of step S90, and when it is judged in step S88 that there has been a cache hit, the processor 360 determines the slot state of the storage cache memory 32 (S90), transfers the write data to the storage cache memory 32 (S91), performs differential bitmap processing to manage the differential bitmap (S92), unlocks the write destination address (S93), executes a write processing completion report for the host computer 10 (S94), and ends the processing in this routine.

Figure 27B:
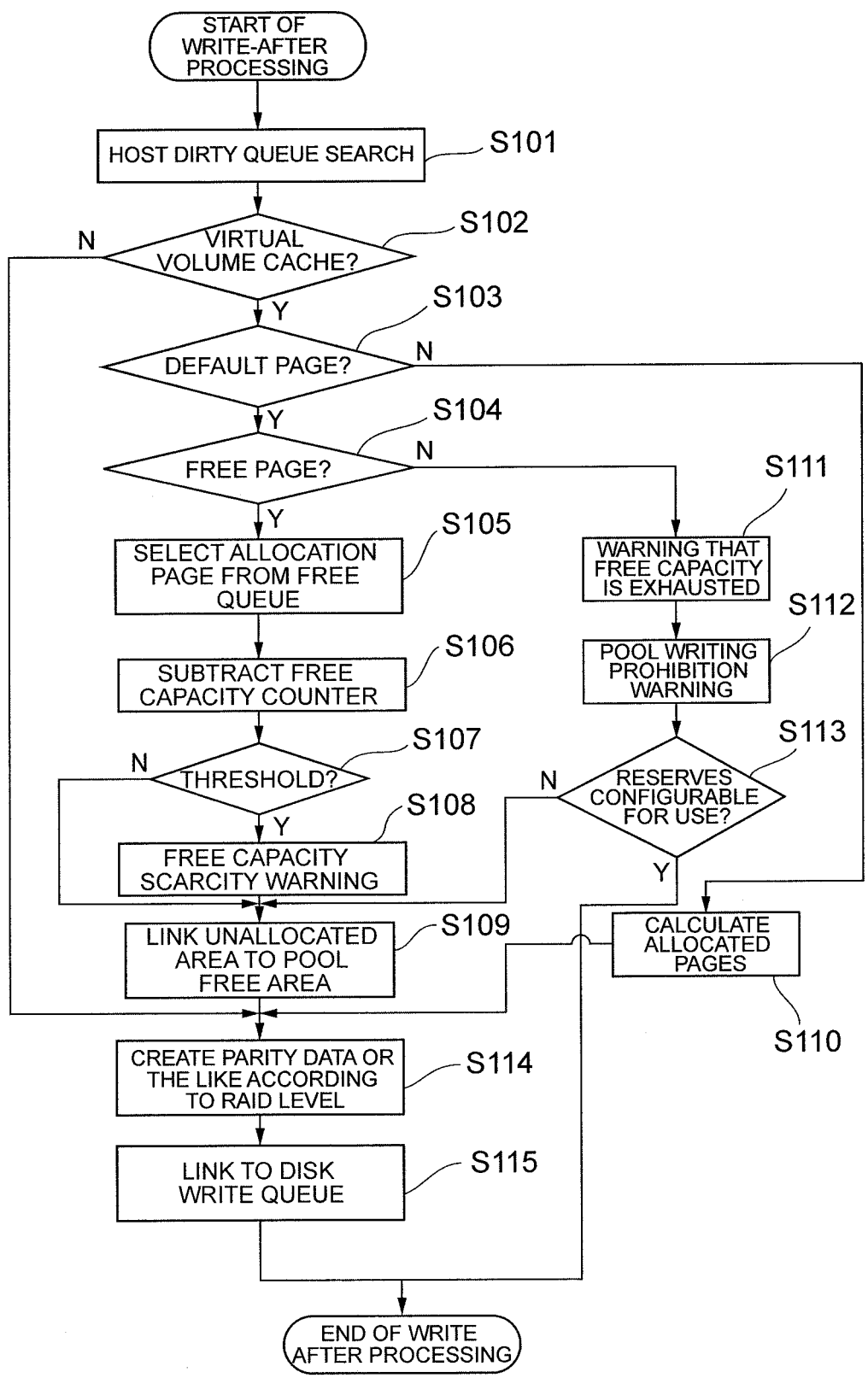
FIG. 27B A flowchart illustrating write-after processing.

Write-after processing will be explained next as write processing of the primary logical volume and secondary logical volume with reference to the flowchart in FIG. 27B.

This processing is started as a result of the processor 360 of the controller 31 running the disk I/O program 3505. The processor 360 first performs a host dirty queue search (S101), judges whether or not a virtual volume such as the primary logical volume 462, for example, is cached (S102) and when the primary logical volume 462 is cached, judges whether or not there is a default page (S103), and when there is a default page, judges whether there is a free page (S104).

When there is a free page, the processor 360 selects an allocation page from the free queue as new allocation processing (S105), subtracts the free capacity counter (S106), and judges whether or not the subtraction result is the threshold (S107); when the subtraction result is the threshold, the processor 360 issues a warning that free capacity is scarce (S108) and then advances to the processing of step S109; when the processor 360 judges that the subtraction result is not the threshold, links the unallocated area to the pool free area (S109), and moves to the processing of step S114.

However, when it is judged in step S103 that there is no default page, the processor 360 calculates the allocated page (S110), and then advances to the processing of step S114.

Furthermore, when it is judged in step S104 that there is no free page, the processor 360 issues a warning that the free capacity is exhausted (S111), then issues a warning to prohibit pool writing (S112), then judges whether or not reserves are configurable for use (S113); when reserves are not configurable, the processor 360 moves to the processing of step S114 and when configurable, the processor 360 terminates the processing in this routine.

In step S114, the processor 360 creates parity data and so on in accordance with RAID level, performs processing to re-link the created parity data and so on to the disk write queue (S115), and terminates the write-after processing.

Figure 28:
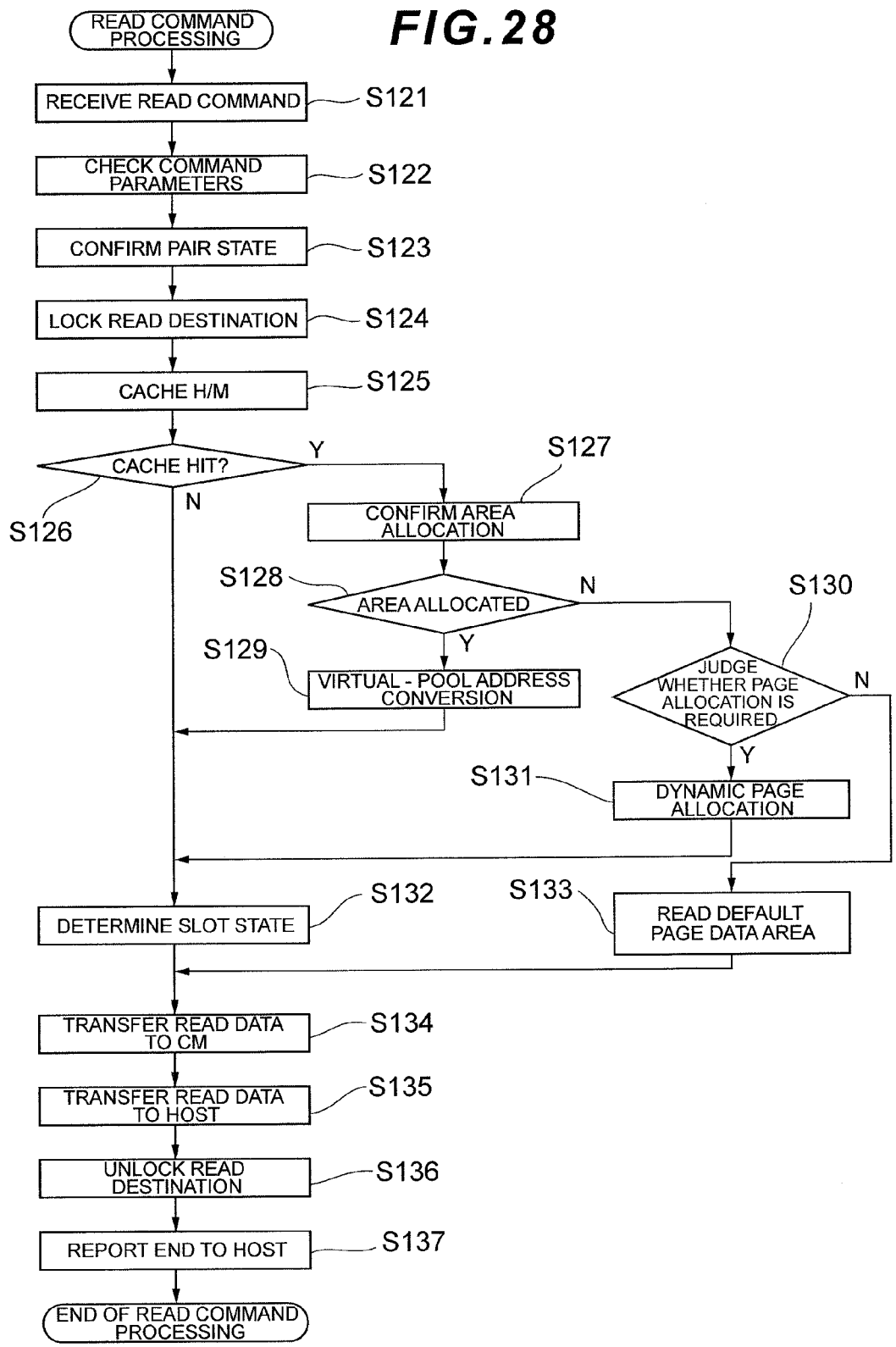
FIG. 28 A flowchart illustrating read command processing.

Read command processing with respect to the primary logical volume and secondary logical volume will be explained next with reference to the flowchart in FIG. 28.

This processing is started as a result of the processor 360 of the controller 31 running the command control program 3501 and the disk I/O program 3505.

The processor 360 first receives a read command (S121), checks the parameters of the received read command (S122), then confirms the pair state based on the result of checking the command parameters, for example the pair state of the primary logical volume 462 and the secondary logical volume 464 (S123), then locks the read destination (S124), executes cache hit or cache miss processing to check whether read data exists in the storage cache memory 32 (S125), and judges whether or not there is a cache hit (S126).

When there is a cache hit, the processor 360 confirms whether there is area to be allocated in the storage cache memory 32 (S127), judges whether area in the storage cache memory 32 has been allocated (S128) and when area has been allocated, performs virtualization pool address conversion (S129).

When area has not been allocated in the storage cache memory 32, the processor 360 judges whether or not page allocation is required (S130), and upon judging that page allocation is required, the processor 360 dynamically allocates pages to the storage cache memory 32 and advances to the processing of step S132.

Upon judging in step S126 that there is no cache hit, the processor 360 determines the slot state in the storage cache memory 32 (S132) and upon judging in step S130 that page allocation is not required, the processor 360 reads the data area of the default page (S133) and then transfers read data to the storage cache memory 32 (S134).

The processor 360 then transfers read data of the storage cache memory 32 to the host computer 10 (S135), unlocks the read destination (S136), issues a completion report to the effect that read command processing is complete to the host computer 10 (S137), and terminates the read command processing.

Figure 29:
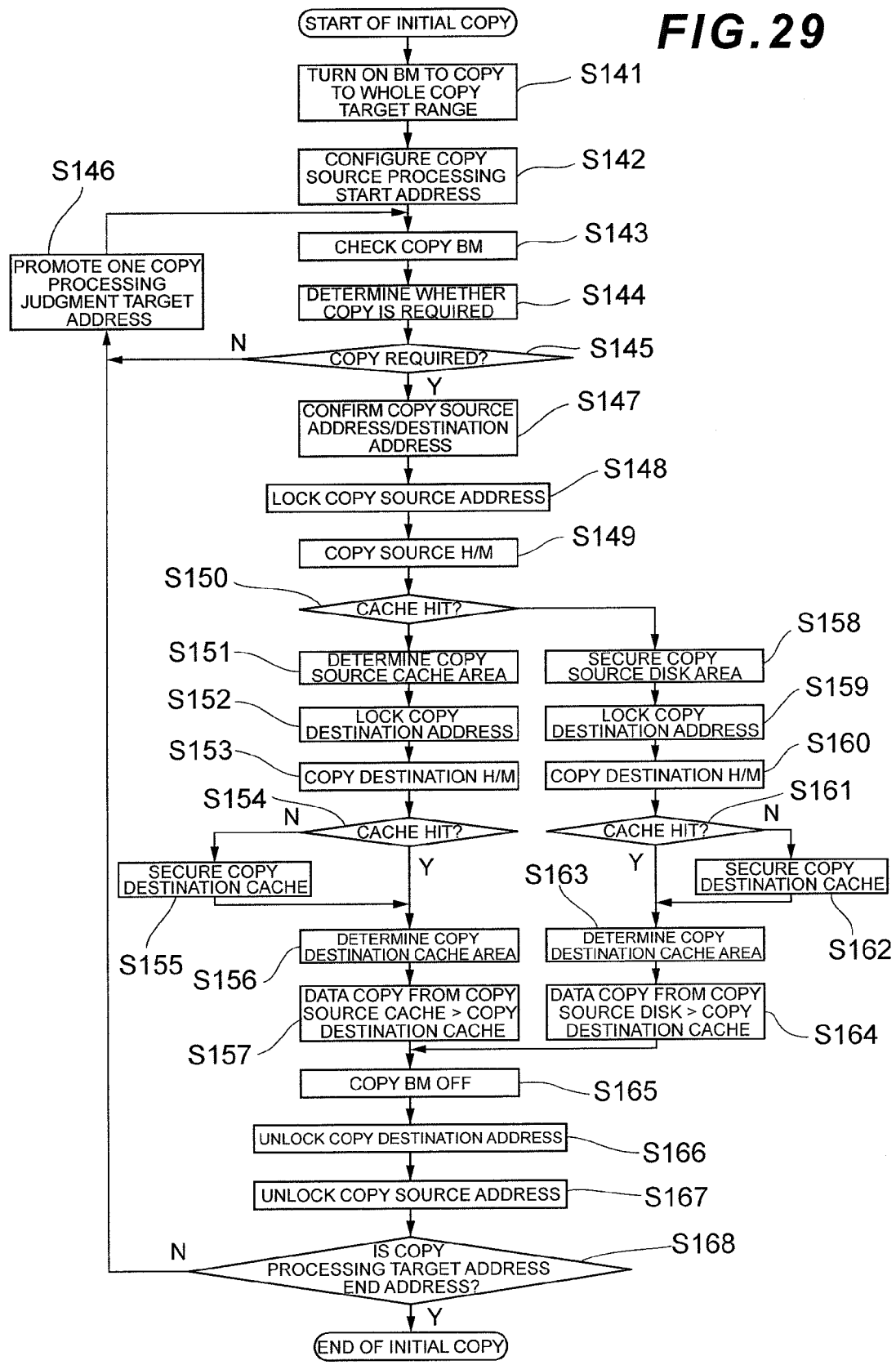
FIG. 29 A flowchart illustrating initial copy processing.

Initial copy processing will be explained next with reference to the flowchart in FIG. 29. This processing is started when the controller 31 receives a pair request command, for example, as a state transition command from the host computer 10.

First, when the controller 31 receives a pair request command, the processor 360 performs processing for turning ON a bitmap for copying to the whole copy target range (S141), configuring a processing start address of the primary logical volume 462, for example, as the copy source processing start address (S142), checking the copy bitmap (S143), and judging whether or not a copy is required (S144), judges whether or not a copy is required (S145), and when a copy is not required, the processor 360 advances to the processing of step S146, promotes one copy-processing judgment target address first, returns to the processing of step S143, and then repeats the processing of steps S143 to S145.

Meanwhile, when it is judged in step S145 that a copy is required, the processor 360 confirms the copy source address and copy destination address, and when, for example, the primary logical volume 462 is the copy source and the secondary logical volume 464 is the copy destination, confirms the addresses of the primary logical volume 462 and secondary logical volume 464 (S147), locks the copy source address (S148), performs copy source hit (H) or hit miss (M) processing for judging whether copy source data exists in the storage cache memory 32 (S149), and judges whether or not there is a cache hit (S150).

When there is a cache hit, the processor 360 performs processing to determine the copy source cache area (S151), lock the copy destination address (S152), and check for a copy destination-related hit or miss (S153), and judges whether or not there is a cache hit to the copy destination storage cache memory 32 (S154).

When there is no cache hit, the processor 360 secures cache area at the copy destination (S155), determines the cache area at the copy destination (S156), copies the data in the copy-source storage cache memory 32 to the copy-destination storage cache memory 32 (S157), and advances to the processing of step S165.

However, when it is judged in step S150 that there is no cache hit, the processor 360 performs processing to secure the copy source disk area (S158), lock the copy destination address (S159), and check for a hit or miss with respect to the copy destination (S160), and then judges whether or not there is a cache hit (S161). When there is no cache hit, the processor 360 secures area in the copy-destination storage cache memory 32 (S162), determines, when there is a cache hit, the cache area in the area of the copy-destination storage cache memory 32 (S163), copies the data in the copy-source disk to the copy-destination storage cache memory 32 (S164), and advances to the processing of step S165.

In step S165, the processor 360 turns OFF the copy bitmap and then unlocks the copy destination address (S166), then unlocks the copy source address (S167), judges whether or not the copy processing target address is the end address (S168), and when it is not the end address, the processor 360 returns to the processing of step S146 and, after promoting one copy processing judgment target address, returns to the processing of step S143 and repeats the processing of steps S143 to S168; upon judging that the copy processing target address is the end address, the processor 360 ends the initial copy.

Figure 30:
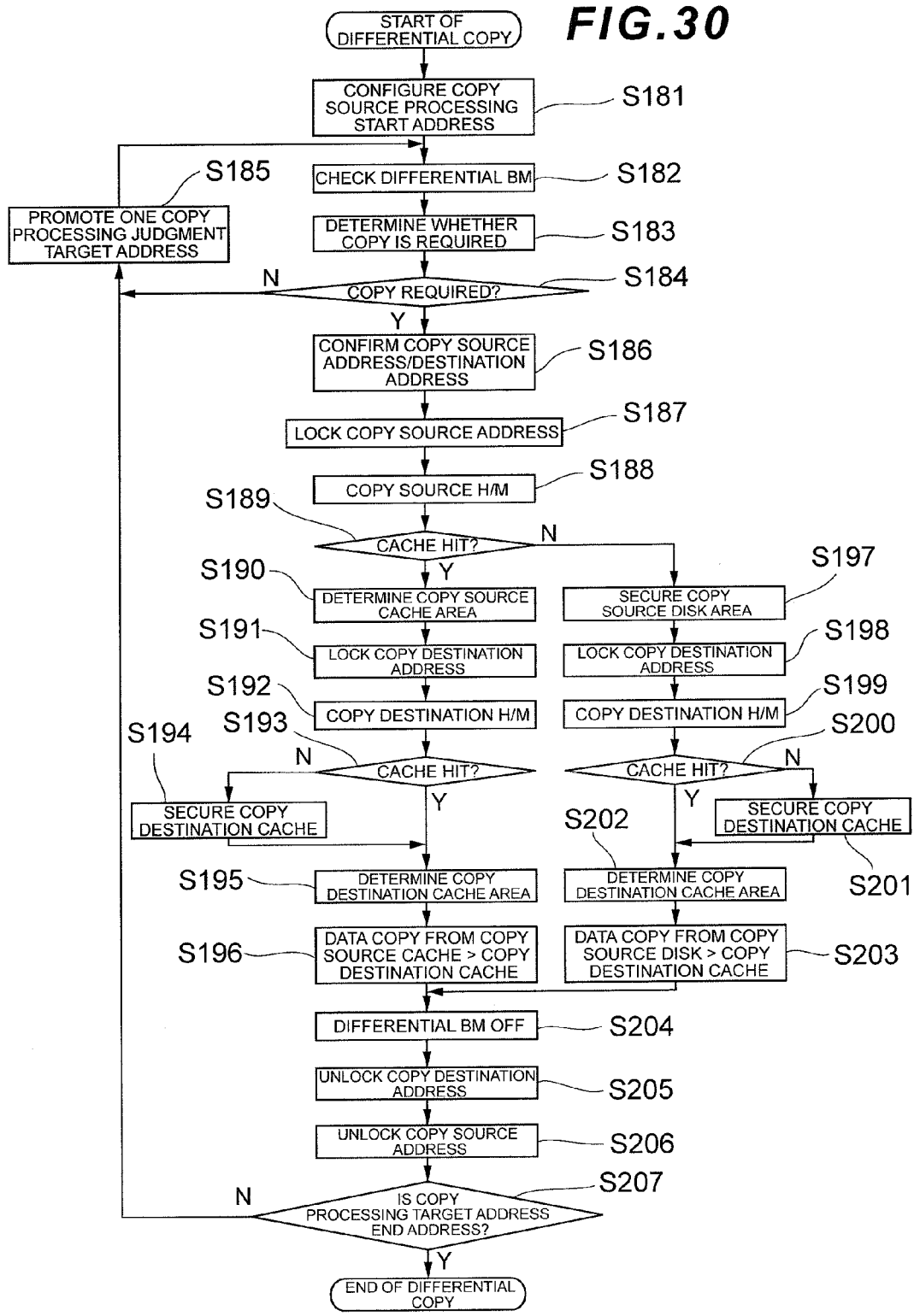
FIG. 30 A flowchart illustrating differential copy processing.

Differential copy processing will be explained next with reference to the flowchart in FIG. 30. This processing is started when the controller 31 receives a pair re-sync command, for example, as a state transition command from the host computer 10.

Upon receiving a pair re-sync command, the processor 360 of the controller 31 first configures a processing start address of the primary logical volume 462, for example, as the copy source processing start address (S181), and then checks a differential bitmap (a differential bitmap processed in step S92 of FIG. 27A) (S182), and then performs processing to judge whether or not a copy is necessary (S183), and judges whether or not a copy is required (S184). Upon judging in step S184 that a copy is not required, the processor 360 advances to the processing of step S185, promotes one copy processing judgment target address, returns to the processing of step S182, and repeats the processing of steps S182 to S184.

Meanwhile, when it is judged in step S184 that a copy is required, the processor 360 confirms the copy source address and copy destination address, and when, for example, the primary logical volume 462 is the copy source and the secondary logical volume 464 is the copy destination, confirms the addresses of the primary logical volume 462 and secondary logical volume 464 (S186), locks the copy source address (S187), performs copy source hit (H) or hit miss (M) processing for judging whether copy source data exists in the storage cache memory 32 (S188), and judges whether or not there is a cache hit (S189).

When there is a cache hit, the processor 360 performs processing to determine the copy source cache area (S190), lock the copy destination address (S191), and check for a copy destination-related hit or miss (S192), and judges whether or not there is a cache hit to the copy destination storage cache memory 32 (S193).

When there is no cache hit, the processor 360 secures cache area at the copy destination (S194), then determines the cache area at the copy destination (S195), copies the data in the copy-source storage cache memory 32 to the copy-destination storage cache memory 32 (S196), and advances to the processing of step S204.

However, when it is judged in step S189 that there is no cache hit, the processor 360 performs processing to secure the copy source disk area (S197), lock the copy destination address (S198), and check for a hit or miss with respect to the copy destination (S199), and then judges whether or not there is a cache hit (S200). When there is no cache hit, the processor 360 secures area in the copy-destination storage cache memory 32 (S201), determines, when there is a cache hit, the cache area in the area of the copy-destination storage cache memory 32 (S202), copies the data in the copy-source disk to the copy-destination storage cache memory 32 (S203), and advances to the processing of step S204.

In step S204, the processor 360 turns OFF the copy bitmap and then unlocks the copy destination address (S205), then unlocks the copy source address (S206), judges whether or not the copy processing target address is the end address (S207), and when it is not the end address, the processor 360 returns to the processing of step S185 and, after promoting one copy processing judgment target address, returns to the processing of step S182 and repeats the processing of steps S182 to S207; upon judging that the copy processing target address is the end address, the processor 360 ends the differential copy.

Figure 31:
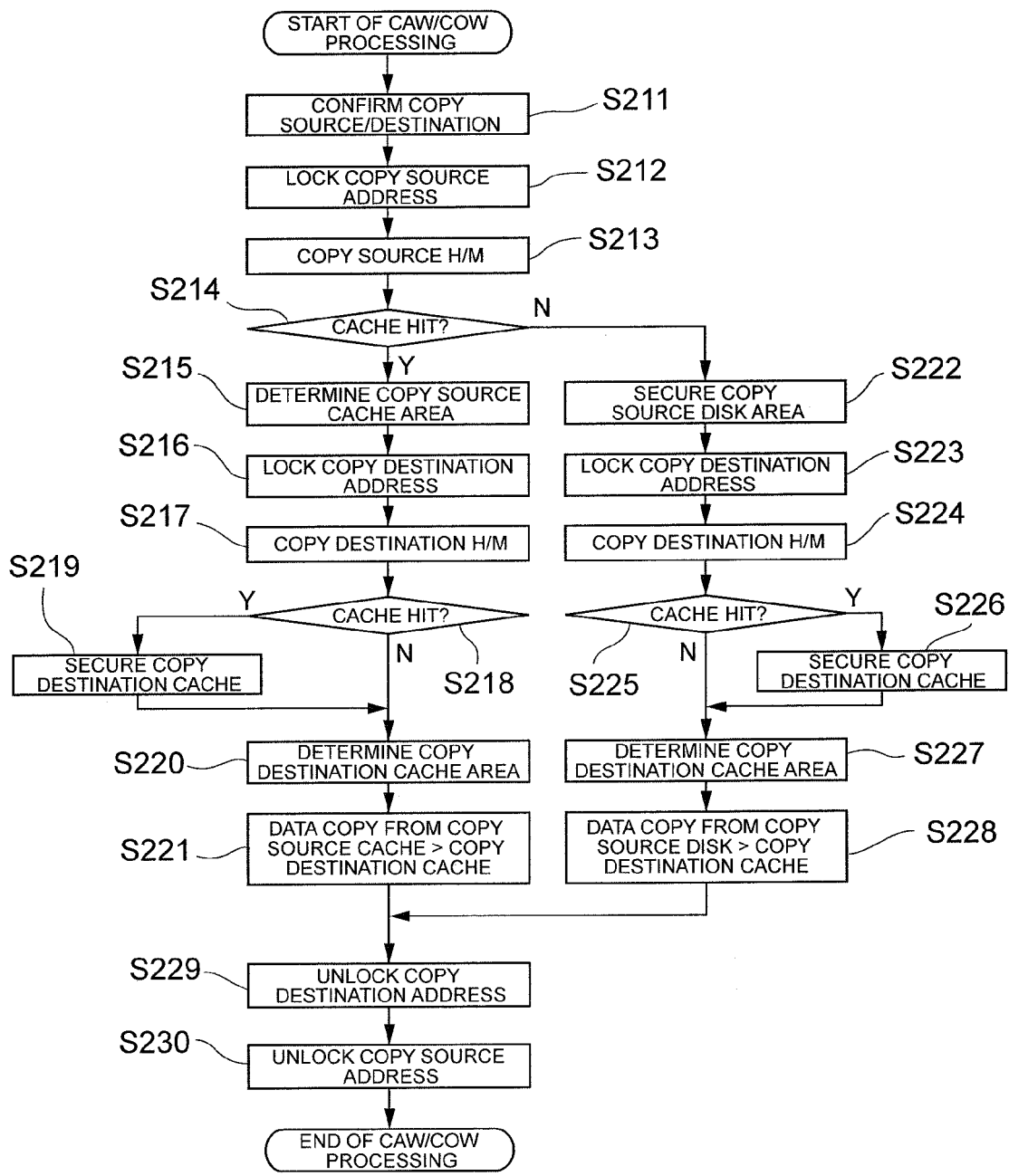
FIG. 31 A flowchart illustrating copy-after-write and copy-on-write processing.

Copy-after-write (CAW) and copy-on-write (COW) processing will be explained next with reference to the flowchart in FIG. 31.

This processing is started by the controller 31 when write access to the primary logical volume 462 is executed by the host computer 10 or when read access or write access to the secondary logical volume 464 is executed thereby.

The processor 360 first performs processing to confirm the primary logical volume 462, for example, as the copy source and processing to confirm the secondary logical volume 464, for example, as the copy destination (S211), and starts processing to lock the copy source address (S212), and check for a cache hit or cache miss with respect to the copy source (S213), and performs judgment of whether or not data which is to be copied to the copy source storage cache memory 32 exists (S214).

When there is a cache hit, the processor 360 performs processing to determine the copy source cache area (S215), lock the copy destination address (S216), and check for a copy destination-related hit or miss (S217), and judges whether or not there is a cache hit to the copy destination storage cache memory 32 (S218).

When there is no cache hit, the processor 360 secures cache area at the copy destination (S219), then determines the cache area at the copy destination (S220), copies the data in the copy-source storage cache memory 32 to the copy-destination storage cache memory 32 (S221), and advances to the processing of step S229.

However, when it is judged in step S214 that there is no cache hit, the processor 360 performs processing to secure the copy source disk area (S222), lock the copy destination address (S223), and check for a hit or miss with respect to the copy destination (S224), and then judges whether or not there is a cache hit (S225).

When there is no cache hit, the processor 360 secures area in the copy-destination storage cache memory 32 (S226), determines, when there is a cache hit, the cache area in the area of the copy-destination storage cache memory 32 (S227), copies the data in the copy-source disk to the copy-destination storage cache memory 32 (S228), and advances to the processing of step S229.

In step S229, the processor 360 unlocks the copy destination address and then unlocks the copy source address (S230) and terminates the copy-after-write (CAW) and copy-on-write (COW) processing.

Figure 32:
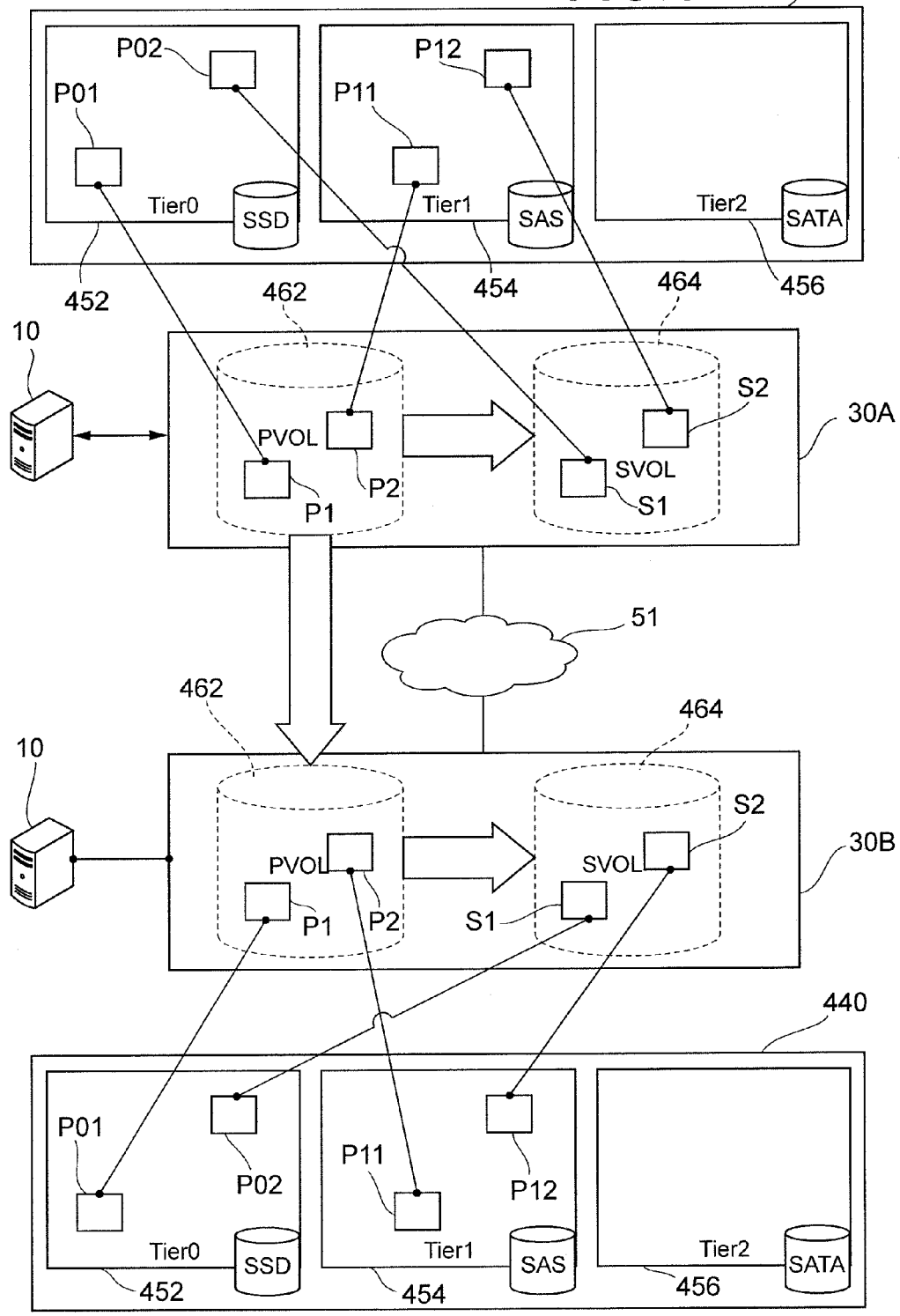
FIG. 32 A block diagram to illustrate remote copy processing.

Disaster recovery processing of the computer system will be described next with reference to FIG. 32. FIG. 32 shows the configuration of a computer system when a storage system with the same configuration as the storage system 30 is a local storage system 30A, another storage system with the same configuration as the storage system 30 is a remote storage system 30B, and when the local storage system 30A and the remote storage system 30B are connected by a storage network 51.

Here, upon starting the processing of the disaster recovery (DR), when a remote copy command is transmitted via the storage network S1 from the local storage system 30A to the local storage system 30B, the data of the primary logical volume 462A is copied to a primary logical volume 462B of the remote storage system 30B, and then the data of the primary logical volume 462B is copied to the secondary logical volume 464B of the remote storage system 30B.

At this time, in the local storage system 30A, when the pool pages P01, P11 are associated with the primary pages P1, P2 and the pool pages P02, P12 are allocated to the secondary pages S1, S2, the pool pages P01, P11 are also allocated to the primary pages P1, P2 and pool pages P02, P12 are allocated to the secondary pages S1, S2 respectively in the remote storage system 30B.

In other words, when data is backed up from the local storage system 30A to the remote storage system 30B, backup source pages and backup destination pages in the same tier are associated with one another.

Figure 33:
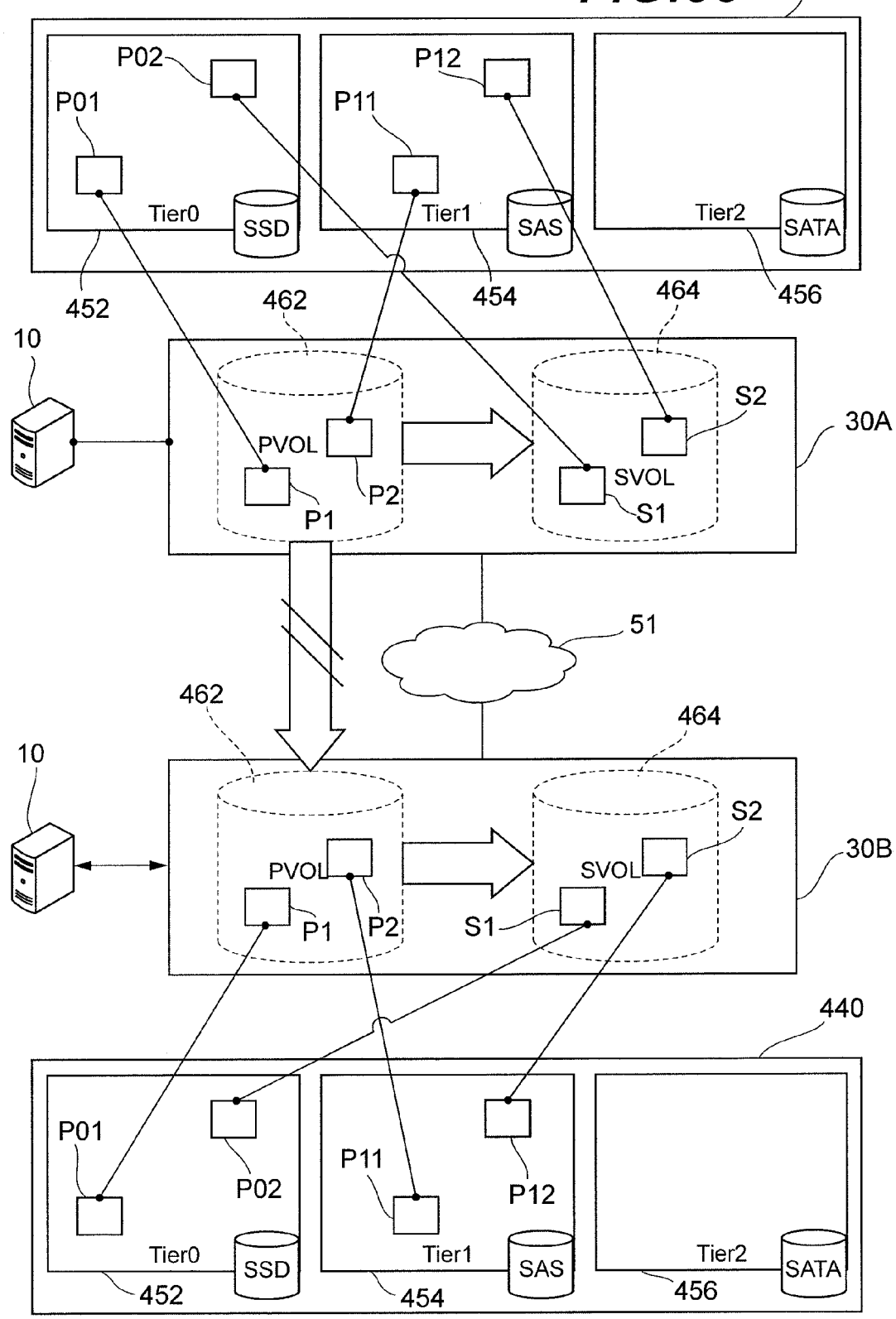
FIG. 33 A block diagram to illustrate pair suspend processing after remote copy.

Processing, in which a pair suspend command is input to the remote storage system 30B after data of the local storage system 30A has been backed up to the remote storage system 30B, will be described next with reference to FIG. 33.

When, after the data of the local storage system 30A has been backed up to the remote storage system 30B, a pair suspend command is transferred to the remote storage system 30B from the local storage system 30A, the controller 31 of the local storage system 30A and the remote storage system 30B individually execute I/O processing from the host computer 10 in accordance with remote copy stoppage.

For example, when I/O processing from the host computer 10 is received in the remote storage system 30B in a pair create state, for example, the I/O processing from the host computer 10 is executed.

Figure 34:
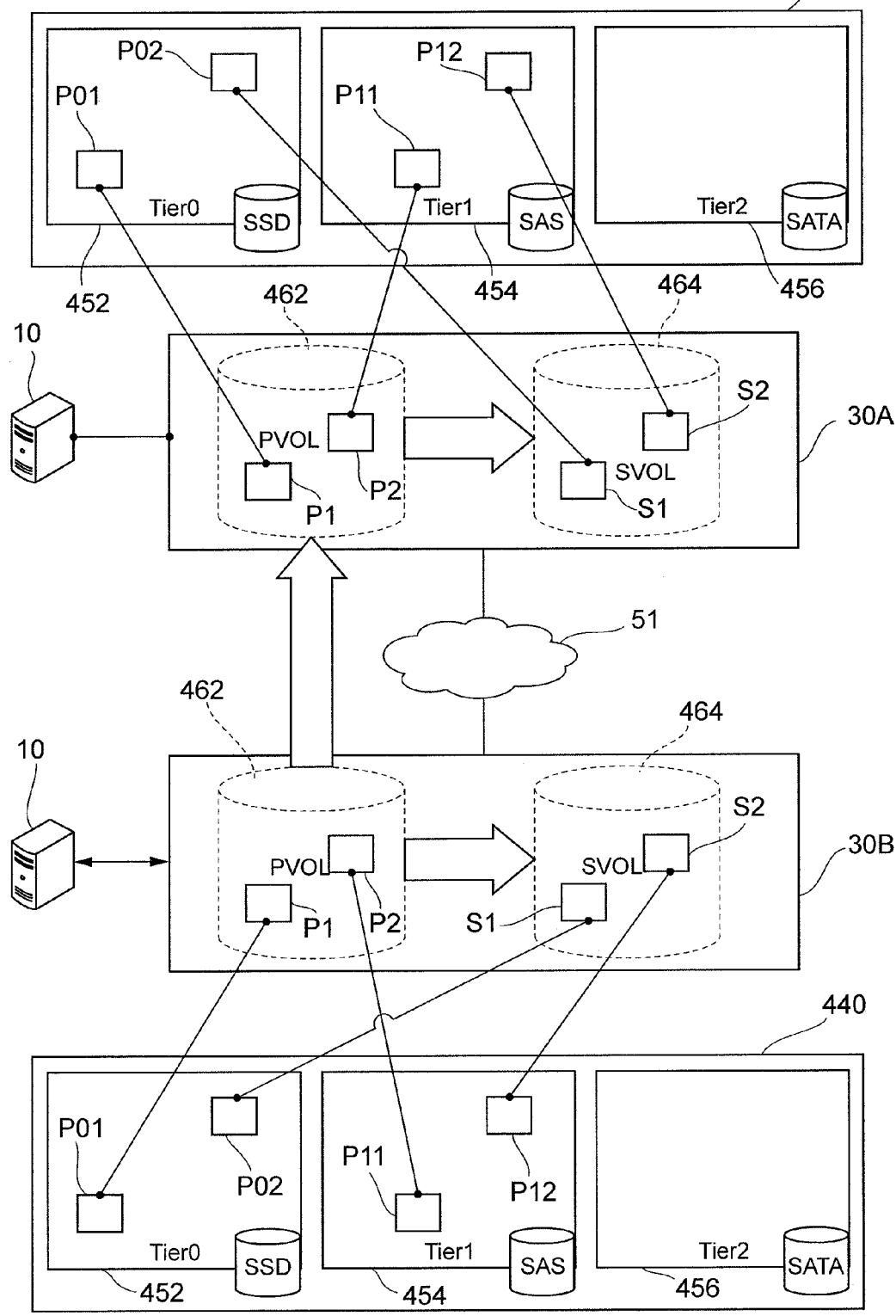
FIG. 34 A block diagram to illustrate reverse processing after remote copy.

Recovery processing when the local storage system 30A has recovered from a disaster will be described next with reference to FIG. 34.

When, after data has been backed up to the remote storage system 30B, the local storage system 30A undergoes disaster recovery and the data in the remote storage system 30B is copied to the local storage system 30A, a reverse processing command is transferred to the local storage system 30A from the remote storage system 30B and the data of the primary logical volume 462B in the remote storage system 30B is copied to the primary logical volume 462A in the local storage system 30A. Thereafter, data of the primary logical volume 462A in the local storage system 30A is copied to the secondary logical volume 464A.

As shown in FIG. 35, when a remote copy is complete, information to the effect that remote copying due to recovery processing is complete is transferred to the remote storage system 30B from the local storage system 30A via the storage network S1, and recovery processing is complete.

Furthermore, various processing is executed in the local storage system 30A and the remote storage system 30B respectively in accordance with commands from the host computer 10. For example, when a state transition command is issued from the host computer 10, the processing shown in FIGS. 16 to 26 is executed as processing conforming to the state transition command by the controller 31 of the local storage system 30A and the controller 31 of the remote storage system 30B.

According to this embodiment, when a command relating to pair formation is received from the host computer 10, a pool page which belongs to the same tier is allocated to the primary page and secondary page, and then when a pair-related state transition command is received and page migration is instructed by the state transition command, the pool page allocated to the secondary page is migrated to the pool page of a different tier from the pool page allocated to the primary page and the migrated pool page is allocated to the secondary page; it is therefore possible to allocate a suitable physical device 34 to the secondary page of the secondary logical volume 464 in accordance with the state transition command.

Moreover, according to this embodiment, a suitable physical device 34 can be allocated to the secondary page of the secondary logical volume 464 in accordance with the state transition command and hence performance and reliability can be improved according to the logical volume application.

In addition, according to this embodiment, a pool page which is allocated to the primary page of the primary logical volume 462 can also be migrated to a pool page in a different tier according to the state transition command.

REFERENCE SIGNS LIST

10 Host computer
20 Storage system management apparatus
30 Storage system
30A Local storage system
30B Remote storage system
31 Controller
32 Storage cache memory
33 Shared memory
34 Physical device
40 Management network
50 Storage network
360 Processor
400 Virtual device
410 Logical device
420 System pool
440 Hierarchical management-type capacity virtualization pool
460 Virtual volume
462 Primary logical volume
464 Secondary logical volume

The invention claimed is:

1. A storage system comprising:
a plurality of storage devices including a plurality of types of storage devices, each of the type of storage devices having a performance that is different from each of the other types of storage devices, and providing a plurality of pool areas; and
a controller,
wherein the controller is configured to:
provide a primary logical volume and a secondary logical volume to be paired with the primary logical volume;
allocate a plurality of pool areas, each of the plurality of pool areas being provided by one of the plurality of types of storage devices, to a plurality of first logical areas in the primary logical volume to store write data;
change the allocation of each of the plurality of first logical areas to another pool area provided by another type of the storage devices based on an access status of each of the plurality of first logical areas;
when a command to pair the primary logical volume with the secondary logical volume is received, copy data from the plurality of first logical areas in the primary logical volume to the plurality of corresponding second logical areas in the secondary logical volume, and store the copied data in a plurality of pool areas provided by the same type of storage device with the pool area storing the copied data in the first logical volume and allocated to the plurality of corresponding second logical areas in the secondary logical volume; and
when a state transition command relating to the pair is received, migrate data stored in the pool area, allocated to at least one of the first logical area or second logical area, to the another pool area provided by the another type of storage devices and change the allocation of the at least one of the second logical area.

2. A storage system according to claim 1, wherein when the state transition command is a copy pair suspend command to stop an update copy from the primary logical volume to the secondary logical volume, the data stored in the pool area allocated to at least one of the second logical area is migrated to the another pool area provided by the another type of storage device having a lower performance.

3. A storage system according to claim 2,
wherein the data stored in the pool area allocated to at least one of the second logical area is migrated to the another pool area provided by the another type of storage device with having the lowest performance, and
wherein a write data to the secondary logical volume after receiving the copy pair suspend command is stored in the type of storage device having the lowest performance.

4. A storage system according to claim 1,
wherein when the state transition command is a command to spin down an external storage system coupled to the storage system, the controller is further configured to:
migrate data stored in the plurality of pool areas allocated to the plurality of second logical areas to a plurality of pool areas provided by the external storage system, and make the external storage system spin down.

5. A storage system according to claim 2,
wherein when the state transition command is a copy pair re-synchronization command for re-synchronizing the copy pair suspended, the controller is further configured to:
store data which is copied from the first logical area, which is written after the copy pair is suspended, in a pool area, allocated to a corresponding second logical area in the secondary logical volume, provided by the same type of storage devices with the pool areas storing the copied data in the primary logical volume.

6. A storage system according to claim 1,
wherein when the state transition command is a restore command, the controller is further configured to:
restore data from the secondary logical volume to the first logical volume and store the restored data in the pool area, which is allocated to the first logical volume, provided by the type of storage device used to store the restored data in the first logical volume.

7. A storage system according to claim 1,
wherein when the state transition command is a quick store command, the controller is further configured to:
make the primary logical volume a new secondary logical volume and make the secondary logical volume a new primary logical volume;
switch access to the primary logical volume from the command source to the new secondary logical volume and switches access to the secondary logical volume from the command source to the new primary logical volume; and
migrate data stored in the storage area allocated to the second logical areas in the new primary logical volume, which is provided by a different type of storage device which provide the pool area allocated to the corresponding first logical areas of the new secondary logical volume, to the pool area provided by the same storage device.

\* \* \* \* \*